Feb. 7, 1933. G. F. DALY ET AL 1,896,540
TABULATING MACHINE
Filed March 30, 1928 14 Sheets—Sheet 2

Feb. 7, 1933.   G. F. DALY ET AL   1,896,540
TABULATING MACHINE
Filed March 30, 1928   14 Sheets-Sheet 3
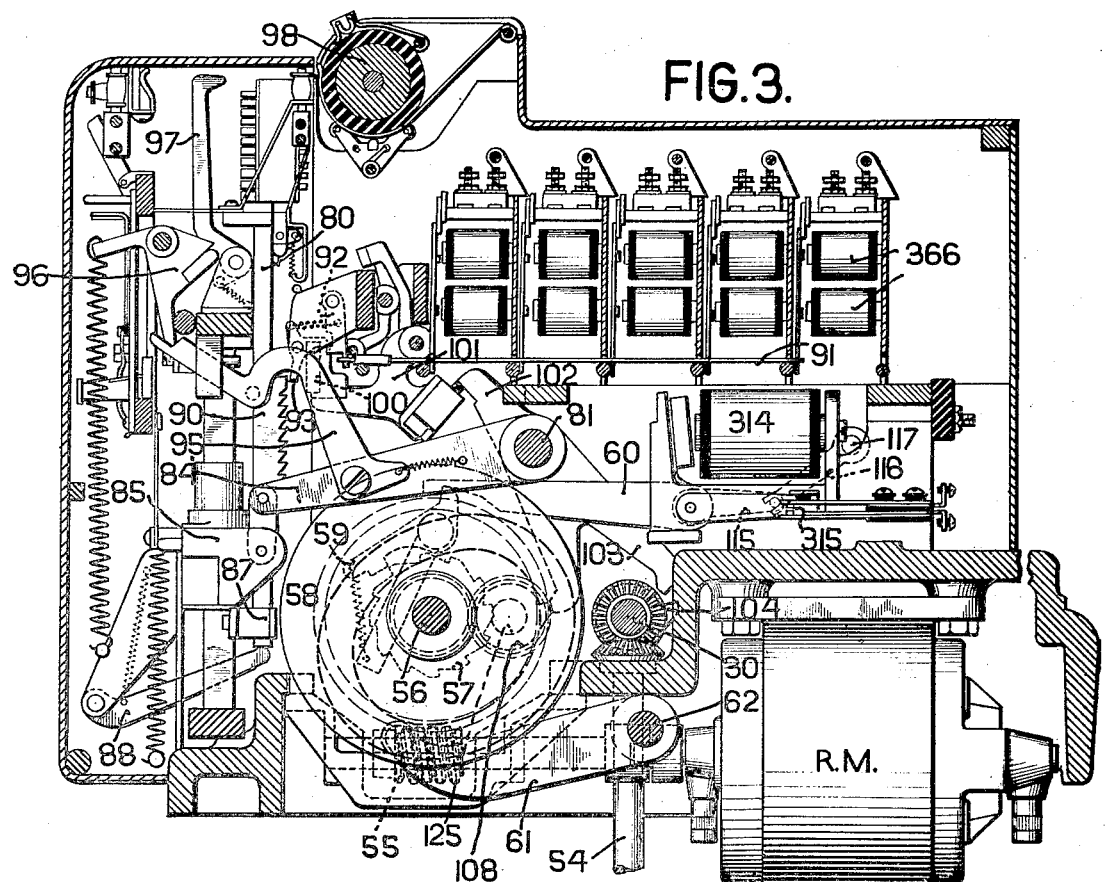
FIG.3.
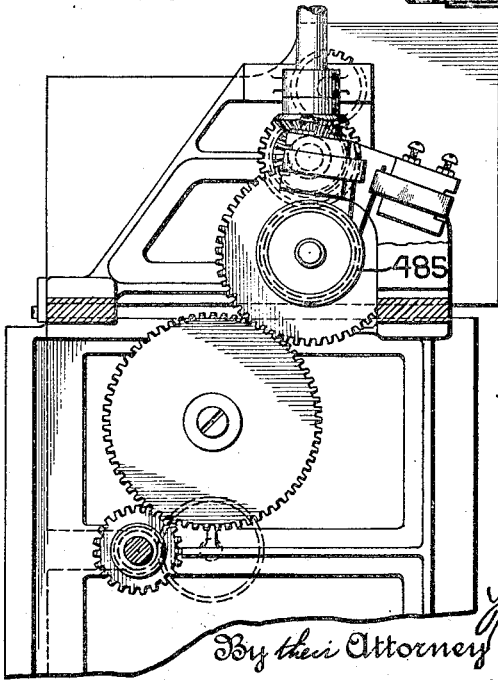
Inventor
George F. Daly
Ralph E. Page
By their Attorney
W. M. Wilson Feb. 7, 1933. G. F. DALY ET AL 1,896,540
TABULATING MACHINE
Filed March 30, 1928 14 Sheets-Sheet 5

Feb. 7, 1933.    G. F. DALY ET AL    1,896,540
TABULATING MACHINE
Filed March 30, 1928    14 Sheets-Sheet 7

Inventor
George F. Daly
Ralph E. Page
By their Attorney

Feb. 7, 1933.  G. F. DALY ET AL  1,896,540
TABULATING MACHINE
Filed March 30, 1928   14 Sheets—Sheet 8

Feb. 7, 1933.  G. F. DALY ET AL  1,896,540
TABULATING MACHINE
Filed March 30, 1928  14 Sheets-Sheet 14

INVENTOR
George F. Daly
Ralph E. Page
BY
W. M. Wilson
ATTORNEY

Patented Feb. 7, 1933

1,896,540

UNITED STATES PATENT OFFICE

GEORGE F. DALY, OF JOHNSON CITY, AND RALPH E. PAGE, OF BINGHAMTON, NEW YORK, ASSIGNORS TO THE TABULATING MACHINE COMPANY, OF ENDICOTT, NEW YORK, A CORPORATION OF NEW JERSEY

TABULATING MACHINE

Application filed March 30, 1928. Serial No. 265,958.

The invention concerns accounting machines and more particularly accounting machines of the record controlled tabulator type.

Many of the improvements resulting from the invention are adaptable to tabulators of either the electrical or mechanical type and practically all of them may be realized in connection with machines operating according to single or combinational hole systems. For the purpose of disclosure, however, an electrical tabulator of the single hole type has been selected such as shown in copending applications of J. W. Bryce, Serial No. 119,803 filed July 1, 1926 corresponding to British Patent 273,731 of 1927 and Serial No. 222,467 filed Sept. 28, 1927 now issued as Patent No. 1,791,953.

The principal object of the invention is to provide a tabulating machine of improved selectivity of operation and of increased utility together with simplification and improvement of the wiring and switching arrangements and improvement of the mechanical structure with a view to imparting additional operating features as well as improvement in and increased efficiency and utility of the features previously found in such machines.

Another object of the invention is to provide a record controlled tabulator of the adding and subtracting type in which specific improvements and novel arrangement and construction of parts are introduced with a view to extending the scope of subtracting operations which may be performed by the machine.

Another object of the invention is to provide a simpler and more easily manipulable switching system for the general control of a tabulator. More specifically this phase of the invention contemplates the replacement of a multiplicity of manually operable switches by a switching structure having a single operating member and having provisions for effecting by a single operation all the connections formerly effected by the plurality of separately operable switches. The preferred form of this new switching structure comprises a dial switch whose operating member may be turned to a number of switching positions in each of which all the necessary circuits are closed for a type of operation corresponding to the position.

Such a dial switch may be provided for each accumulator and may have positions for listing, adding and indicating operations. When the operating member is turned to the listing position, for example, all circuits necessary to adapt the accumulator for listing are closed. Other dial switches may be provided for each accumulator to permit preselection of the several types of total taking, such as total with accumulator reset, total without accumulator reset and balance printing in the case of subtracting machines. In the latter type of machine, additional dial switches may be provided to permit preselection of the several accumulators for positive or negative balances.

Another object of the invention resides in the provision of new and improved mechanism for introducing true complements of numbers on record cards into the accumulators in additive subtraction operations.

Another object of the invention is to provide for the conservation of card space in representing items which are to enter into a subtracting operation. The accumulating section of machines of the commercial type are usually permanently divided into accumulating banks each of which contain a given number of accumulator wheels or denominational orders. When a true complement of a number is thrown into one of these banks to effect subtraction, it is necessary to account for each denominational order of the bank; for example, if the complement of 254 is to be entered on a nine counter bank the actual figure which must be entered is 999, 999, 746 and not merely the significant figures 746. The practice heretofore has been to use nine columns on the controlling cards for the entry of subtractive items, punching the columns to the left of the first significant figure in the zero positions. According to the present invention only sufficient card columns need be assigned to subtractive items to accommodate the maximum number of significant figures and arrangements are made for automatically entering the necessary nines on the counter wheels to the left in the bank.

Another object of the invention is to provide for improvements in timing the operation of the general controlling circuits of the machine. The principal improvement in this respect resides in an arrangement for delaying the beginning of the total and reset operation until the end of the last listing cycle. Heretofore the total and reset operation has been instituted slightly before the end of the previous listing cycle, introducing the possibility of undue shocks to the printing mechanism. By delaying the beginning of the total and reset operation until all moving parts of the printing mechanism have actually come to rest, this source of shock has been eliminated and it has been possible to increase both the listing and totaling speeds of the machine. Other improvements in the control circuits are incorporated in the contacts for governing the tabulating motor circuits during listing and tabulating operations.

Another object of the invention is to provide new and improved mechanism for selecting data from a single card of a group for entry into accumulating or printing devices or both and to correlate this mechanism with other machine elements in such manner that new accounting and statistical functions are imparted to the tabulating machine as a whole.

Another object of the invention is to provide for entering data into selected accumulating or printing devices or both from all cards save one of a group. Particular utility results from this feature in that the first card of a group may contain data in certain columns which are of such a nature that they need be handled only once for each group. The following cards of the group may contain either in the same or different columns the usual accumulative or indicating data which must be entered into the accumulating or indicating devices from each card.

The last two objects deal with a broadly new feature of tabulating and statistical machines and may be most clearly understood from a specific example. It may be assumed that a statement is desired showing an old balance as well as an analysis of the current period's business. The first card of the group may be punched to represent the balance of the last preceding accounting period and the remaining cards may be punched to represent items of the current period. The present machine is arranged so that the old balance from the first card of the group may be thrown into an accumulator or indicating bank and further entries into the same bank eliminated during the passage of the following cards of the group. Incidentally another accumulator bank may receive items from all cards except the first one of the group, thus providing for accumulating the items for the current accounting period exclusive of the old balance. Still another accumulating bank may be arranged to receive the old balance from the first card as well as the current items from the following cards, thus providing for a total including the old balance as well as the current items.

Another object of the invention is to combine certain accumulator or indicator selective features with the feature of specially operating upon a single card of a group to the end that the data on the specially handled card may be entered into certain accumulators for combination with data which are selectively entered therein from the other cards of the same group and may be excluded from other accumulators into which data from the other cards is selectively entered.

Still another object of the invention is to further extend the accumulator or indicator selective features of the last paragraph to permit the entry of data from the specially handled card, if desired, into still another accumulator or indicator from which data from the other cards of the group are excluded.

The last two objects, while not limited to any particular type of operation, may be visualized most clearly from a subtracting operation. The first card of a group may contain a balance of the preceding accounting period, while the remaining cards may contain promiscuous debit and credit items. The old balance from the first card may then be entered concurrently into an accumulator or indicator especially assigned to it and into a balance accumulator. The debit and credit items from the following cards may be entered concurrently into this balance accumulator and into another balance accumulator. At the end of the card run then one balance accumulator will show the difference between debit and credit items exclusive of the old balance, another balance accumulator will show the difference between debit and credit items including the old balance and a third accumulator will show the old balance alone.

Another object of the invention is to provide accumulator or indicator selecting mechanism of improved and novel operation and construction.

Another object of the invention is to improve and simplify the group indicating mechanism of the machine. Heretofore the group data from the first card of each group have been entered into an accumulator and listed and further entries suppressed until after a subsequent total taking operation. Alternatively the data from each card was entered into an accumulator and listed to print the group data opposite each listed item. According to the present invention the group data from each card may be entered into an accumulator, there being no suppression of entries, but the listing circuit for the accumulator is automatically interrupted after the passage of the first card so that only one listing of the group data occurs for each card group. According to the present invention, also, the group indicating data may be handled through the single card data feature mentioned above. In this case the entry of all items after the first into an accumulator is suppressed by a multicontact relay controlled solely by timed circuits, replacing the somewhat complicated electro-mechanical switching apparatus formerly used for this purpose.

These and other incidental objects which will be pointed out hereinafter may be clearly understood from the following detailed description which should be read in connection with the accompanying drawings in which:

Fig. 2a is a detail showing the operation of the listing cam clutch and the listing cam contacts;

Fig. 3 is a vertical section through the printing mechanism on line 3—3 of Fig. 1;

Figure 17:
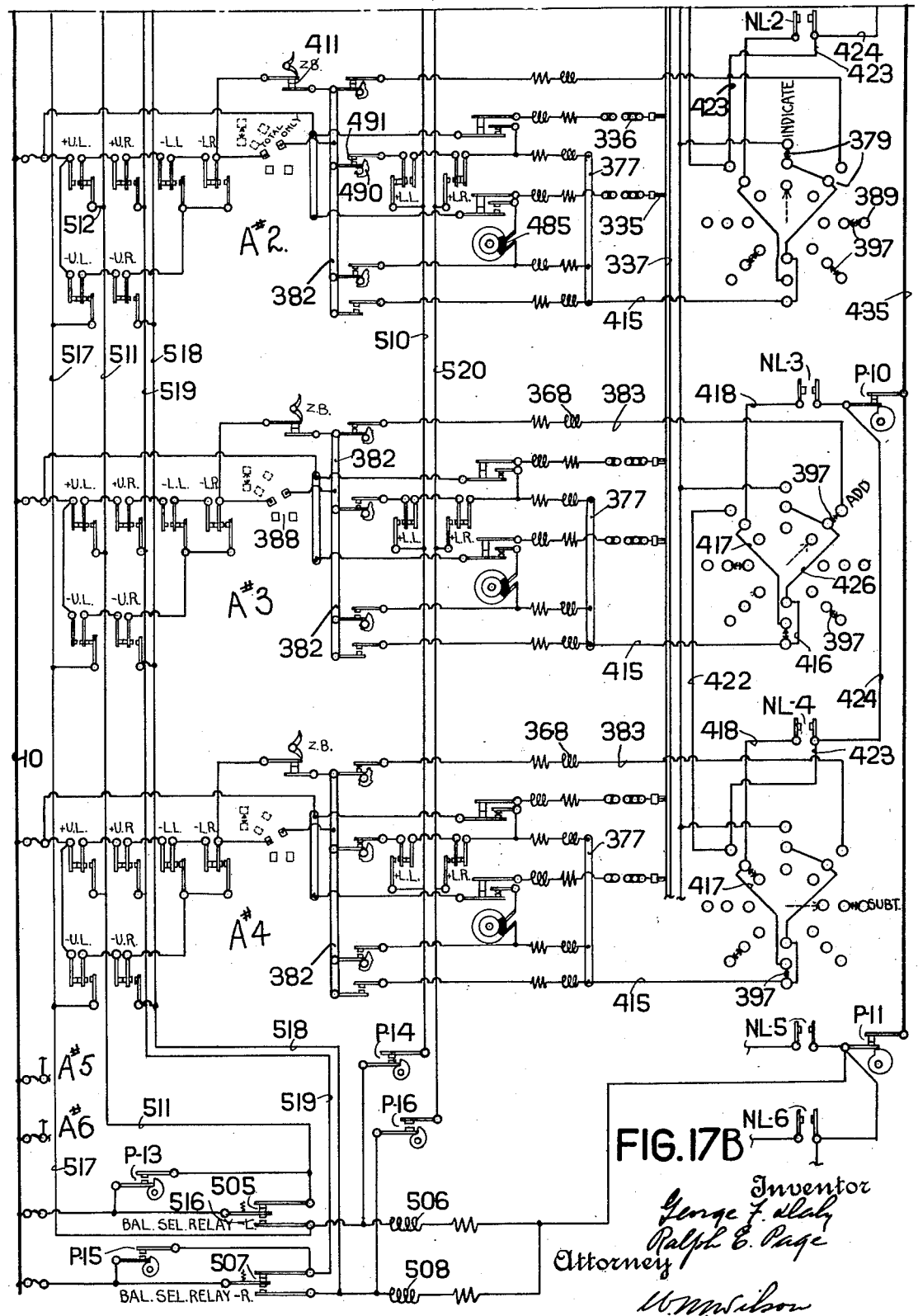
Figure 18:
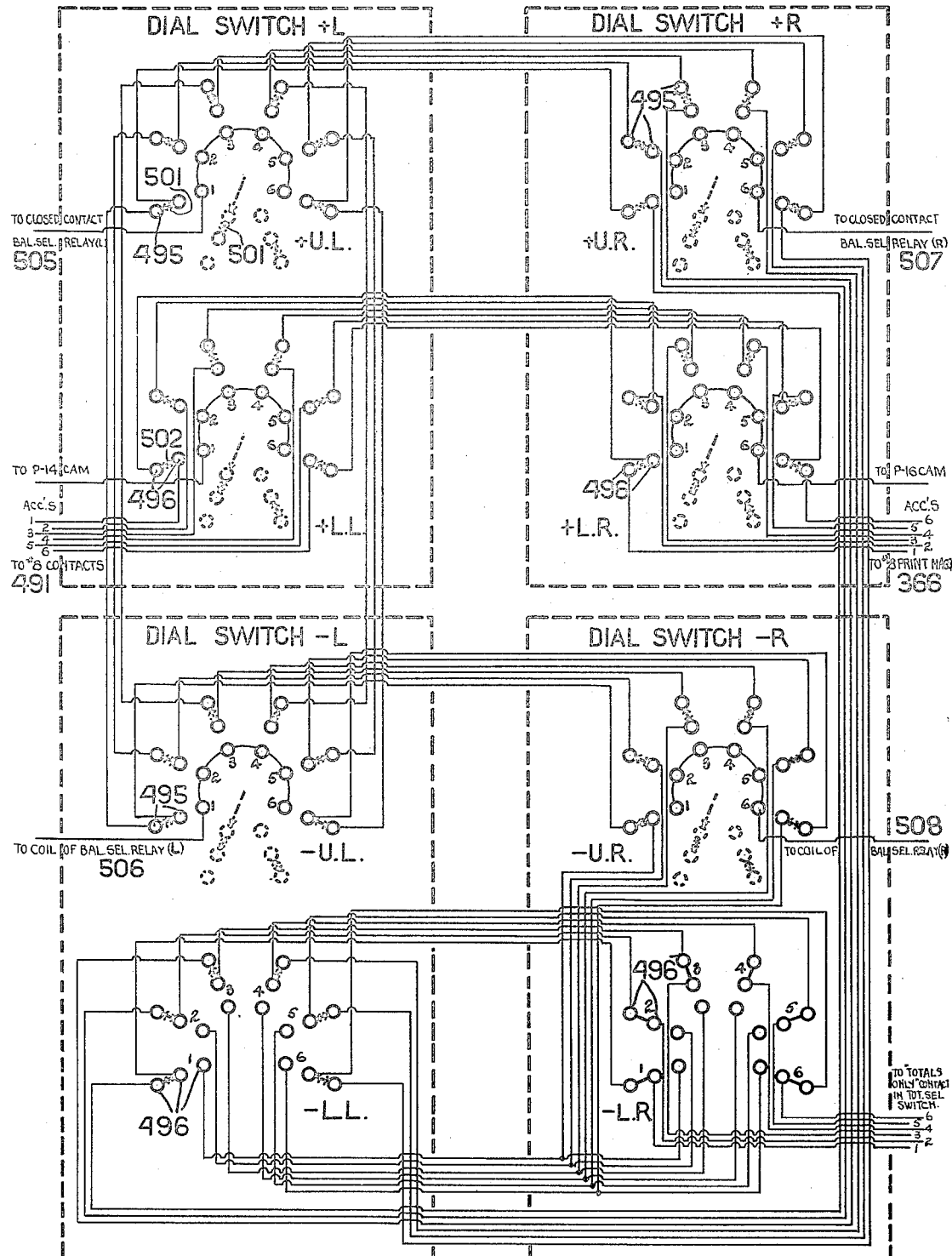

Figs. 17, 17A, and 17B taken together form a complete circuit diagram of the machine, Fig. 17A being placed below Fig. 17 and Fig. 17B below Fig. 17A and, Fig. 18 is a circuit diagram illustrating the circuit connections of the balance selecting dial switches.

Figure 19:
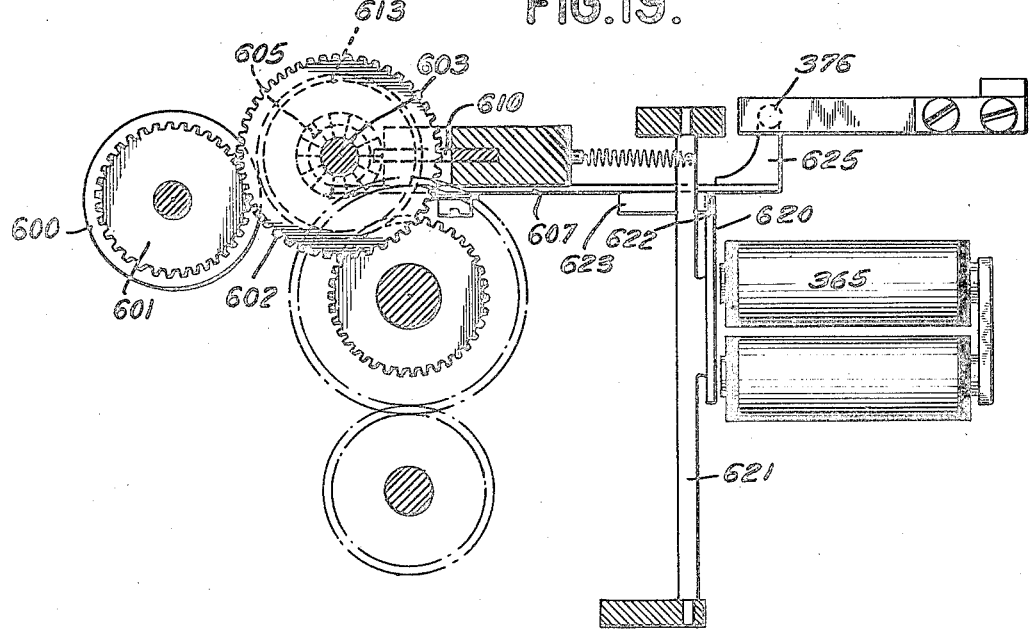
Figure 20:
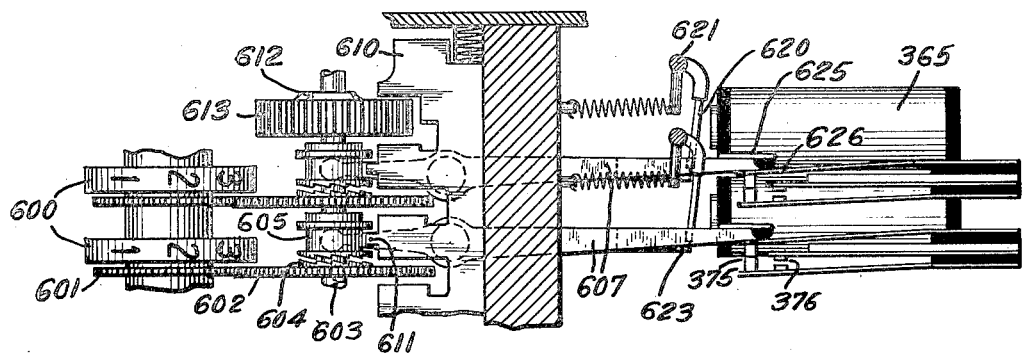

Figs. 19 and 20 are sectional and plan views respectively of the adding mechanism.

*General description*

The invention is illustrated in connection with a subtracting tabulator of the type shown in the previously mentioned copending applications to J. W. Bryce, Serial No. 119,803 (corresponding to Patent 273,731 of 1927) and Serial No. 222,467 (now issued as Patent No. 1,791,953). The principal difference between these copending applications and patents lies in the translator mechanism for converting items on cards into their complements for entry into the accumulator mechanism to effect additive subtraction. The subtracting operation is fully explained in the copending applications and patents referred to above and the translator mechanisms used in the present case are fully described in Patent No. 1,791,953. The explanation of the subtracting operation and the construction of the translator mechanisms in the present case will be confined to the features which are essential to an understanding of the present invention. A subtracting tabulator, as in these applications, is controlled from perforated records in which items to be subtracted, for example debit and credit items, are entered in the same card columns in their true value. Cards bearing one type of item, for example credit cards, are provided with a distinguishing perforation adapted to cooperate with the analyzing mechanism of the machine to select one of two accumulators for entry of the items. Items from the other class of cards, for example debit cards or those having no distinguishing perforation, may be entered into the other accumulator. This provides for a summation of all debit items in one counter and all credit items in another counter.

The adding mechanism of these machines is well known and fully described in U. S. patent to Lake 1,307,740, June 24, 1919. It is illustrated in Figs. 19 and 20 and will be briefly described to aid in an understanding of the adding operation. Referring to Figs. 19 and 20 the counter elements are shown at 600 and may be driven by attached gears 601 which mesh with gears 602 loose on shaft 603. Gears 602 are provided with hub portions 604 having clutch teeth formed on their end faces. Sliding clutch elements 605 are splined to shaft 603 so that they are driven therewith but may be slid into or out of clutching engagement with gears 602. Each clutch element 605 is provided with a circumferential groove into which projects one end of a pivoted shift lever 607. The shaft 603 is driven at a constant rate during adding cycles and by shifting the lever 607 at different times during the cycle, different degrees of rotation of the counter elements 600 may be effected. At the end of each adding cycle all clutch elements 605 which are engaged are automatically disengaged by means of a kick out plate 610. This plate has a projection 611 extending into the circumferential groove of each clutch element 605 and at the end of the adding cycle is moved upwardly in Fig. 20 by a cam 612 carried on the face of a gear 613. The grooves in the clutch elements 605 are wide enough to permit operation of the elements for clutching without interference from the kick out plate projections 611.

The shift lever 607 is controlled by a magnet 365. The armature 620 of this magnet (Fig. 19) is carried by a pivoted rod 621, being offset from this rod as shown in Fig. 20. Thus when the magnet is energized the rod 621 rotates slightly. The rod also carries a latch 622 which normally engages a latch block 623 on shift lever 607 and holds the latter in unclutching position. The rear end of the shift lever has an extension 625 which engages a flat spring 626, this spring tending constantly to shift the lever 607 to clutching position.

The magnets 365 may be energized at different times during the adding cycle by timed electrical impulses initiated by the card analyzing brushes of the machine, these impulses occurring according to the location of perforations on the cards. The different digits are represented by the differential location of the perforations on the cards and the cards are fed through the machine with a steady motion in synchronism with the rotation of the shaft 603. Thus when a card bearing a perforation representing a certain digit passes the analyzing brushes, the magnet 365 is energized at a time corresponding to the value of the digit and on attracting its armature 620 releases the latch 622—623 of shift lever 607. Spring 626 thereupon shifts lever 607 and the latter forces constantly rotating clutch element 605 into engagement with its cooperating clutch element on gear 602. The counter element is thereupon driven from shaft 603 until the end of the adding cycle when the clutch is disengaged by kick out plate 610. This movement of the counter element is thus proportional to the value of the digit represented by the perforation on the record card.

The flat spring 626 forms part of a contact assembly consisting of two pairs of contacts 375 and 376 respectively. Contacts 375 are normally closed and contacts 376 are normally open, but when the control magnet 365 is energized to effect clutching of the counter element, contacts 376 are shifted to open position and contacts 376 are shifted to closed position. The function of these contacts will be explained hereinafter in connection with the circuit diagram.

In addition to this straight summation of the several types of items, they may be subtracted. The machine is provided with two sets of analyzer brushes and the cards successively pass the brushes so that they are analyzed by the second set exactly one machine cycle after they are analyzed by the first set. The first set of brushes picks the items, both debit and credit, from the cards and through suitable translator mechanism fully described in the Patent No. 791,953, translates them into their true complements for entry into one of two balance accumulators. The translation is effected while the cards are passing the first set of brushes, but the corresponding complement is entered into the selected accumulator during the following card cycle when the card bearing the data which was translated is passing the second set of brushes. The card on passing the second set of brushes throws the true number represented by its perforations into one or the other of the two balance accumulators while concurrently the true complement of the number is thrown into the other balance accumulator from the translating mechanism. The true number and complement are thrown into different accumulators from each card and the accumulators which shall receive one or the other are selected by the presence or absence of the designating perforation. For example, if a certain card carries a debit item, its true value will be thrown into one accumulator and its complement into the other. If a card contains a credit item, the presence of the designating perforation effects operation of selecting mechanism causing a shifting of the accumulators so that the first receives the complement of the debit item and the other receives the debit item in its true value. At the end of a card run then, one balance accumulator will indicate a true positive balance between debit and credit items and the other will indicate a negative balance in complementary form. If it is desired to print only the true balance, represented by the presence of a true number on the accumulator, and to suppress printing of the negative balance, as indicated by the presence of a complementary number on the other accumulator, the complementary number may be recognized by the presence of nines on the counters to the left of the first significant figure. A feeler device is provided for each balance accumulator which feels out one of the unused counter elements to the left and if it encounters a nine, indicating the complement, it causes automatic suppression of printing from that accumulator and permits printing from the other which obviously contains the true balance.

The present invention contemplates using these subtracting and selecting features in combination with devices for combining the current balance, as represented by the difference between the aggregate of debit and credit items of a group of cards, with the balance of a previous accounting period. For example, a certain group of cards may represent debit and credit items covering a certain phase of the present month's business. If it is desired to indicate the condition of the business to date for the current year, the balance for the year up to the current month may be punched on a card and this card placed at the beginning of the group. If this balance is combined with the current items and entered according to its characteristics into one or the other of the balance accumulators, obviously the result indicated by the accumulators will represent the balance for the year to date.

Figure 13:
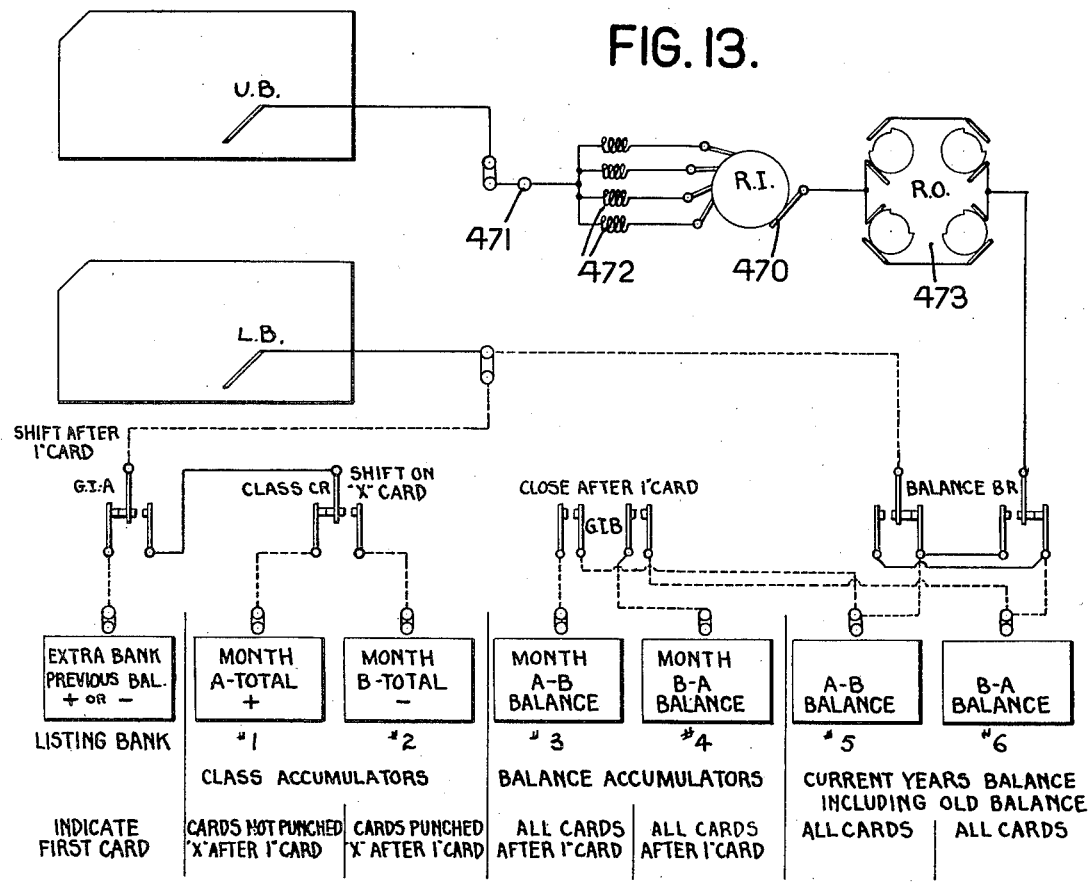
Fig. 13 is a diagrammatic sketch illustrating the connections necessary to obtain the report illustrated in Fig. 14.

The manner in which these results may be obtained will be clear from the diagrammatic representation shown in Fig. 13. The operating coils and devices for the selective contacts have been omitted to simplify the diagram, but will be explained fully hereinafter in connection with the general circuit diagram. The machine is provided with one listing bank, that is a bank which will print but not accumulate, and six accumulator banks represented by the numbers 1 to 6, inclusive. The listing bank is selected to receive and print the previous balance, which is the data carried by the first card of the group. The accumulators 1 and 2 are designed to receive the monthly totals of debit and credits respectively. Accumulators 3 and 4 operate as balance accumulators, 3 showing the difference between debit and credit items and 4 the difference between credit and debit items of the current month exclusive of the old balance. Accumulators 5 and 6 are designed to receive all debit and credit items including the old balance. The printing of the difference from accumulators 3 or 4 and 5 or 6 will, of course, be governed by the presence of a true balance on one of them as previously explained. From this arrangement a comprehensive report may be obtained showing the previous balance to the beginning of the current month, the debit and credit items of the current month with the difference between them and the yearly balance to date including the previous balance as well as the difference between debit and credit items of the current month. To obtain this result the data from the first card representing the previous balance must be thrown into the listing bank and into accumulators 5 and 6, into one of them in its true value and into the other as a complement. The items of the current month must be excluded from the listing bank, debit items entered into accumulator 1, credit items into accumulator 2 and items thrown into accumulators 3 or 4, and 5 or 6, in their true and complementary value as indicated by the presence or absence of a designating perforation representing a credit.

As in the prior applications and patents the reading-in translator commutator R1 cooperates with the upper brushes to pick the data from each card and effect a set up in the reading-out commutators RO corresponding to its complement. One card cycle later, while the card is passing the lower brushes LB, this complement is thrown into the selected balance accumulator, while the lower brushes LB effect entry of the data in its true value into the accumulators 1 or 2 and into the other balance accumulator 3 or 4 and 5 or 6 of each pair. The selection of the balance accumulators is effected by balance relays BR, which, when the card is a debit one containing no designating perforation, effect entry of the complement from the translator into accumulators 4 and 6 and the true number from the lower brushes into accumulators 3 and 5. The presence of a distinguishing perforation showing a credit card reverses the position of the balance relay BR so that the complement is entered into the accumulators 3 and 5 and the true number into the accumulators 4 and 6. It will be recalled that the accumulators 5 and 6 must receive all items including the old balance and these accumulators are wired direct to the balance relay contacts. Accumulators 3 and 4 must receive only the current items, excluding the old balance carried by the first card of the group. These are therefore connected to the balance relay contacts through the contacts GIB which are normally open and close only after the first card has passed the lower brushes. When so closed they remain closed during the remainder of the group thus providing for balances of the current month's items only on accumulators 3 and 4. Accumulators 1 and 2 are to receive debit and credit items respectively, of the current month, the old balance on the first card being eliminated. These accumulators are wired to the lower brushes through the classification relay CR which is governed by the presence or absence of the distinguishing perforation to enter the debit and credit items into the proper accumulator.

Figure 1:
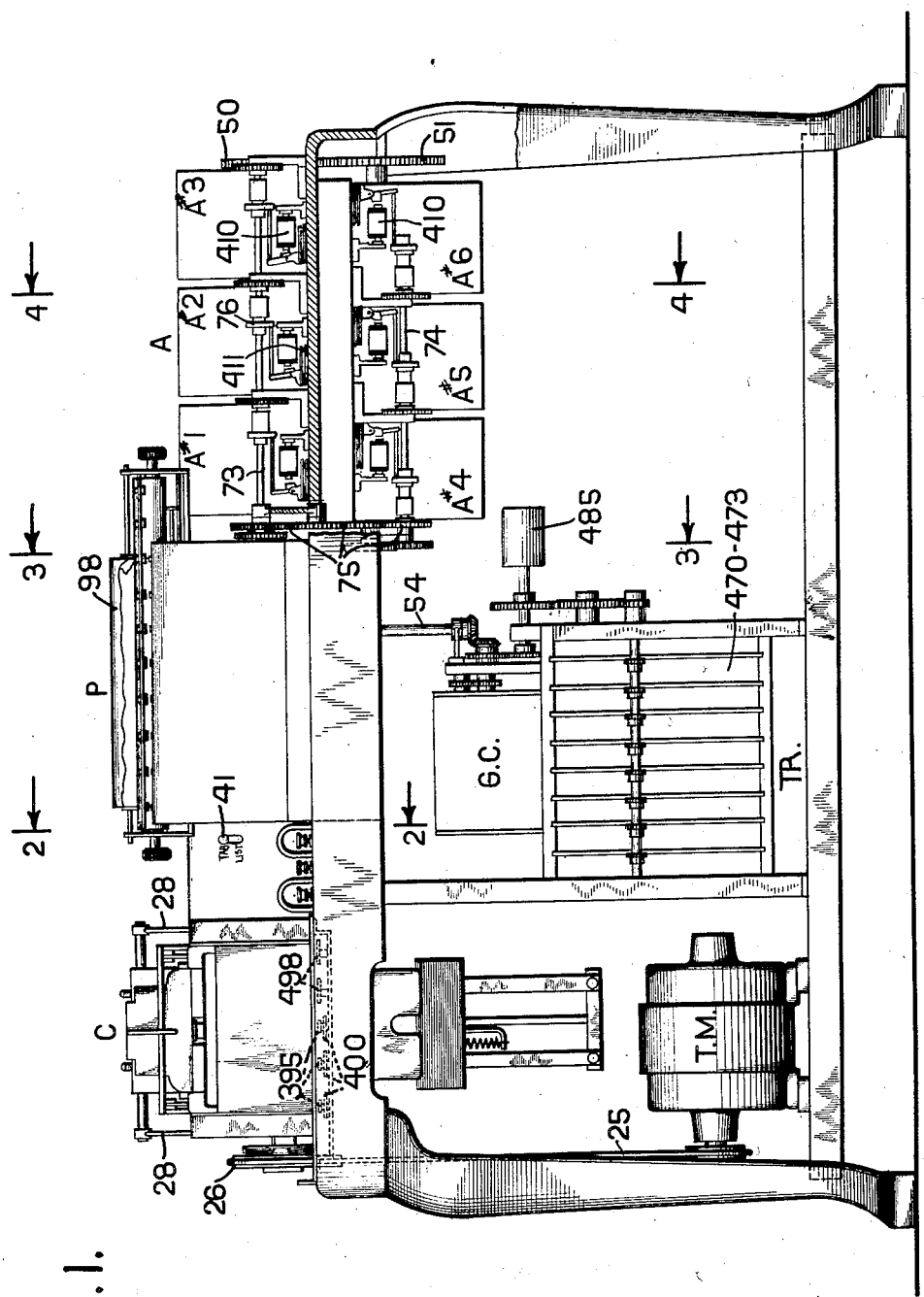
Fig. 1 shows diagrammatically a complete machine with certain parts omitted to expose details of the drive.
Figure 14:
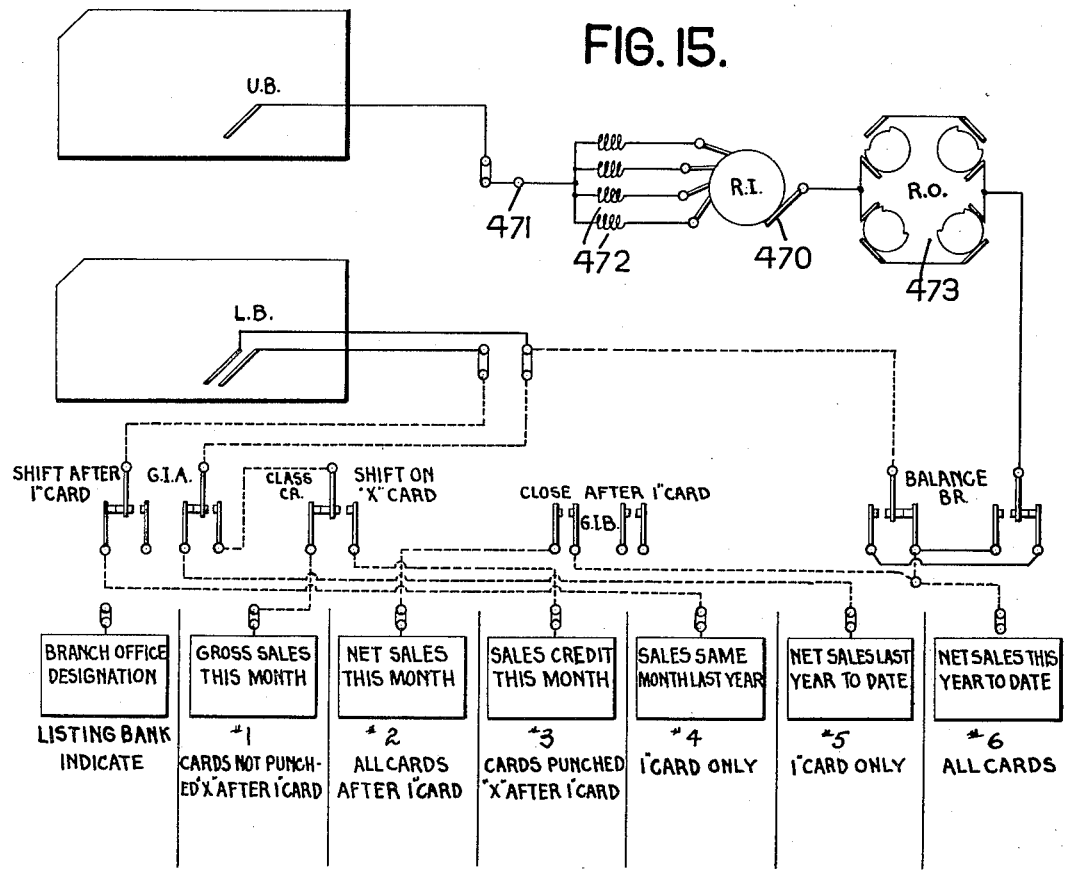
Figure 15:
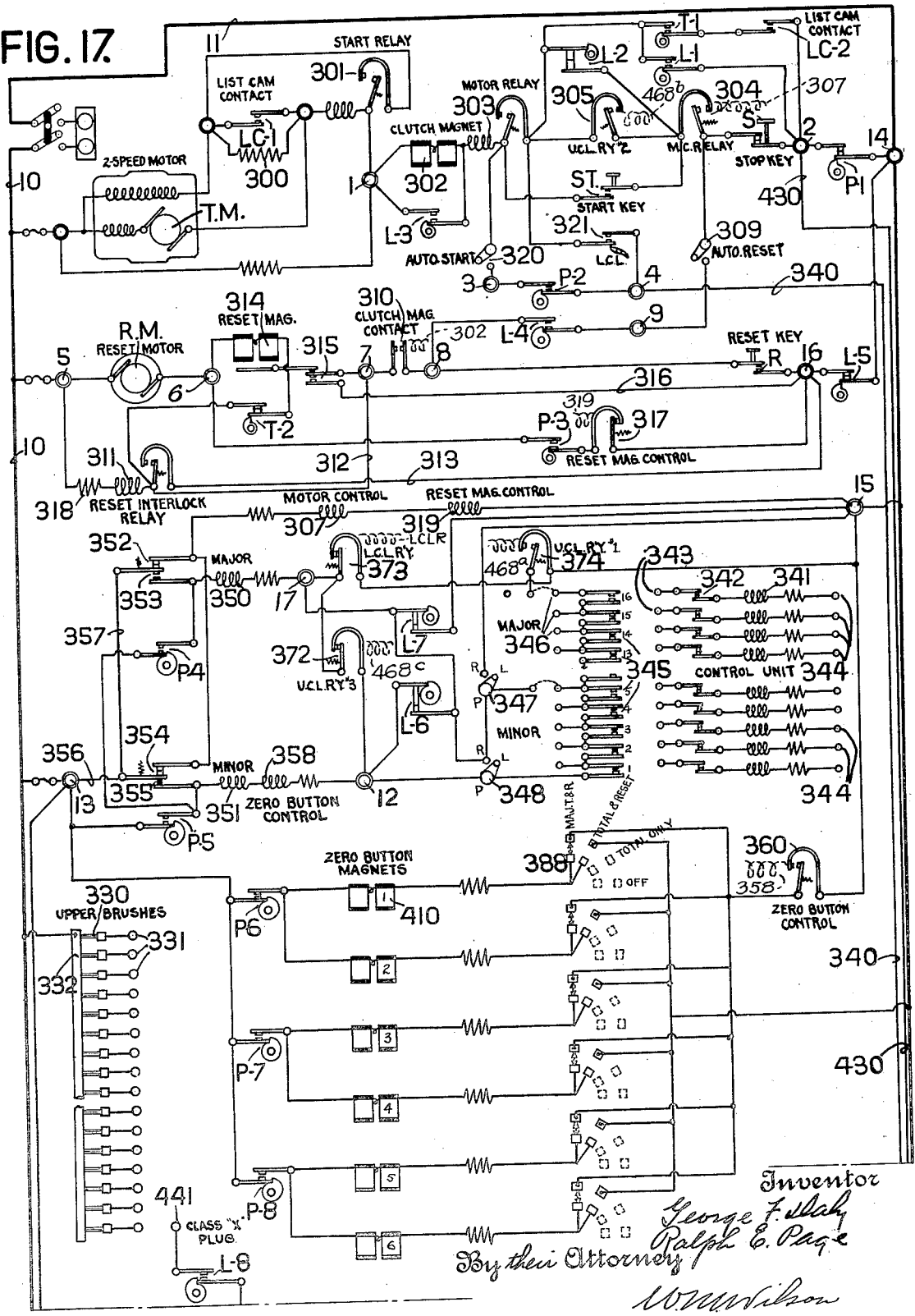
Fig. 15 is a diagrammatic sketch illustrating the connections necessary to obtain the report illustrated in Fig. 16.
Figure 16:
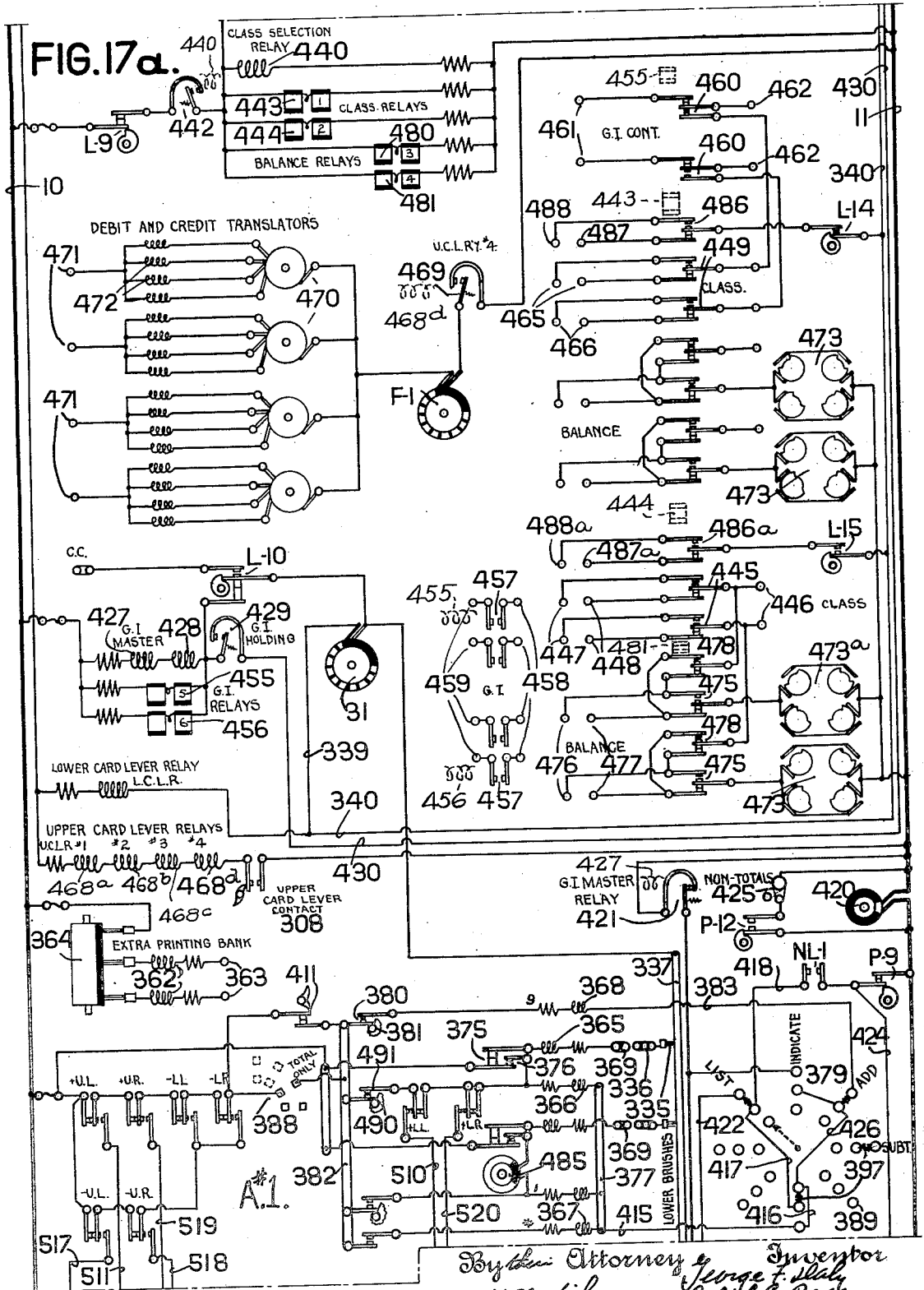

The classification relay contacts are wired through contacts GIA which remain in the position shown during the first active card cycle when the old balance card is passing the lower brushes and in this position serve to throw the old balance into the listing bank. At the end of this first cycle contacts GIA shift, disconnecting the listing bank from the lower brushes and connecting the classification accumulators 1 and 2 to the lower brushes through the classification relay. Hence the old balance is thrown into the listing bank and the debit and credit items of the current month into their proper accumulator 1 or 2. A printed report which may be obtained from the machine using this hookup is indicated in Fig. 14 from which it will be obvious that a very comprehensive report of the current month's business including the old balance is presented. Obviously other reports may also be prepared such as a sales analysis, the hookup of which is indicated in Fig. 15 and the resulting sheet in Fig. 16. The operation to obtain this statement will be obvious from the explanation just given in respect to Figs. 1 and 2. The complete machine is illustrated in Fig. 1 being provided with a card feeding section C, a printing section P and an accumulator section A. During accumulating and listing operation the card feed mechanism, printing mechanism and accumulating mechanism are driven by tabulating motor TM. Cards, perforated to represent numerical data in the usual manner, are placed in a suitable card magazine within the card feeding section C and are fed one at a time through the analyzing devices of the machine. In the present machine the analyzing mechanism consists of two sets of brushes, each card feeding first past the upper set and exactly one cycle later past the lower set. The upper and lower brushes cooperate to automatically control the machine, keeping it in operation if certain classification data on successive cards agree and either stopping the machine or effecting total taking if the classification data change. As each card passes the lower analyzing brushes, the latter serve to close control circuits for each card perforation which cause operation of the accumulator and printing mechanism to totalize and print the items represented upon the cards.

The present machine, as previously explained, may subtract by adding complements of negative items. Such items are picked from the cards by the upper analyzing brushes which effect a set up in the translator mechanism indicated at TR which enters the corresponding complements into the accumulators during the following machine cycle when the cards causing the set up are passing the lower brushes.

On a change in classification or control data on successive cards the tabulator motor operation and card feed is interrupted and a reset motor RM shown in Fig. 3 is called into operation to drive the printer and total taking mechanisms to print totals and clear or reset the accumulators, if desired. The general operation of these mechanisms is well known. The differences in structure from which the advantages of the present invention result and the more convenient arrangement of parts in the present machine will now be explained in detail.

Figure 2:
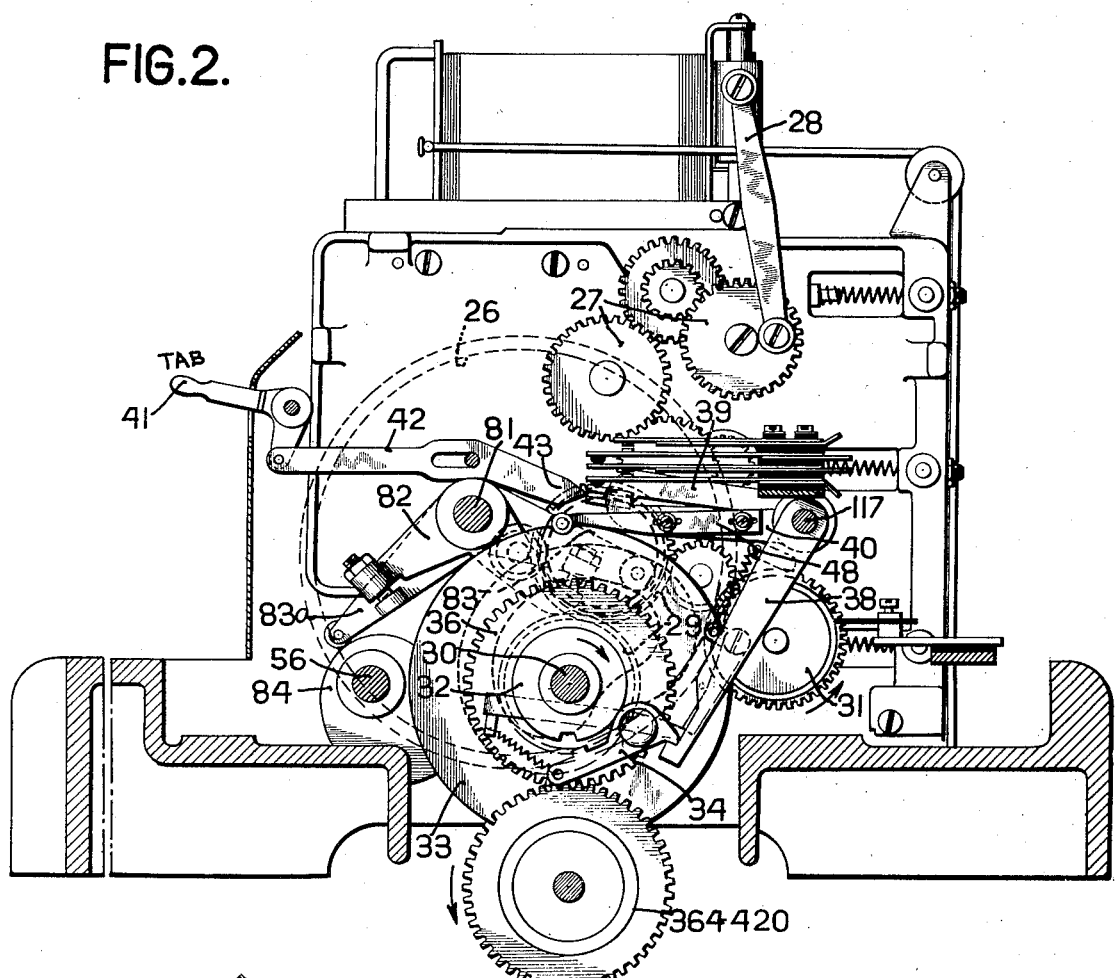
Fig. 2 is a vertical section on line 2—2 of Fig. 1 showing the card feeding section and the listing drive mechanism.

Referring to Figs. 1 and 2 the tabulator motor TM by means of a belt 25 and pulley 26 drives a gear train 27 through a suitable one revolution card feed clutch (not shown) to reciprocate the oscillating link 28 of the card feed mechanism causing it to feed a card to the analyzing brushes for each machine cycle. The pulley through another gear train 29 drives the listing shaft 30 of the machine which in turn, as will be later explained, drives the counter operating shafts. A commutator 31 properly geared to this train serves to energize the lower brushes for each index point position on the cards, breaking the lower brush circuit between the several index points to prevent sparking at the brushes.

This commutator replaces the usual star cam contacts.

The listing shaft 30 has a notched disk 32 fixed to it and the listing box cam 33 is free on the listing shaft and carries a pawl 34 provided with a nose adapted through spring action to engage in the notch in disk 32 when the pawl is released and cause the box cam 33 to rotate with the listing shaft. This box cam in the usual manner causes the type bars to reciprocate for printing during listing operations. A gear 36 fixed to the listing cam 33 drives the listing commutator 364 and a small auxiliary commutator 420 whose purpose will be explained in connection with the circuit diagram. The listing commutator 364 is used in connection with an extra printing bank with which the machine is provided and its purpose is to interrupt the listing circuits for this bank when the machine is in home position and when it is not performing listing operations. An extending tail piece on pawl 34 coacts with a notch in lever 38 which holds the nose portion of the pawl out of contact with the disk 32, thereby preventing rotation of the list cam 33 with the listing shaft 30. The lever 38 is operated by a scissors mechanism comprising arms 39 and 40. The lever 38 is fixed relatively to the arm 39 and a suitable spring urges it to latching position. A list non-list lever 41 in the position shown in Fig. 2 permits these scissors elements to come together allowing the lever 38 to remain in latching position. If the list non-list lever 41 is pulled downwardly (see Fig. 2a), an attached sliding link 42 provided with cam edges at 43 pries the scissors elements apart and causes the lever 38 to rock counterclockwise releasing the pawl 34, whereupon the listing box cam 33 is clutched to the listing shaft 30 and rotates with it.

At the end of a listing operation the pawl 34 remains engaged with the disk 32 so that, even though the lever 41 be thereafter shifted for a tabulating operation, the listing cam will make one revolution during which group data may be printed from the first card of the following group. Means are also provided for releasing the arm 38 temporarily during each total taking cycle to permit the pawl 34 to move to clutching engagement thus also providing for the first printing cycle of the following card group. At the end of this cycle, of course, assuming the machine is set for straight tabulating the arm 38 having moved back to normal position the tail piece of the pawl 34 will engage the notch in the lever and cause it to unclutch. A pair of contacts LC—1 and LC—2 are controlled by the arm 40 so that they will open when the listing cam is in normal position, but will be closed if the list non-list lever 41 is moved to listing position. The arm 40 is provided with an extension 48 carrying a roller at its end which coacts with a notch in the list box cam 33. When this cam is in normal position the roller engages the notch and holds the cam against displacement. During the rotation of the box cam in the first tabulating cycle, the extension 48 together with the arm 40 is lifted by the cam 33 and the contacts LC—1 and LC—2 are closed during this first tabulating cycle. The purpose of these cam contacts is to insure low speed whenever the tabulator is performing printing operations, as will be explained in connection with the circuit diagram.

Figure 4:
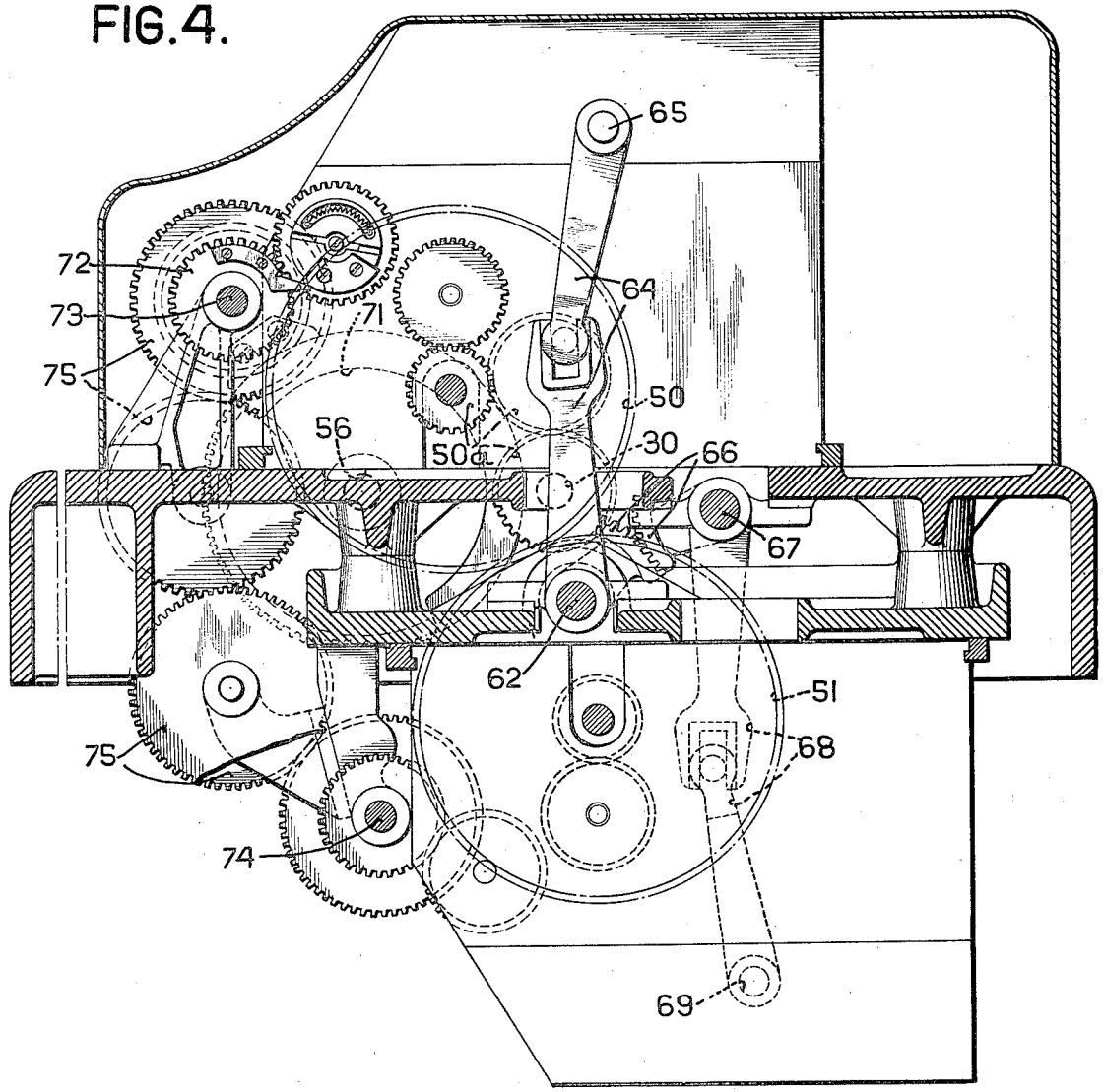
Fig. 4 is a vertical section through the accumulating mechanism on line 4—4 of Fig. 1.

The list shaft 30 (see Figs. 4 and 5) drives the counter shafts of the machine through gears 50a. Two sets of counters are provided as may be seen in Fig. 1, the gear 50 on the counter shaft of one set driving the gear 51 on the counter shaft of the other set. This arrangement is for convenience, to reduce the longitudinal dimension of the tabulator.

The counter elements are operated by magnetically controlled clutches in the usual manner which are energized from the analyzing brushes at differential times in accordance with perforations to enter and totalize items on the counter elements. This operation is fully explained in the copending application of Lake, Serial No. 639,153, May 15, 1923, (now issued as Patent No. 1,822,594) and will not be further dwelt upon herein. Referring to Figs. 1 and 3, the list shaft 30 through beveled gearing and a vertical shaft 54 drives the usual group control unit GC of the machine, the translators TR and a commutator 485 whose purpose will be later explained.

The end of a card group as indicated by a disagreement of the control data on successive cards may cause the machine to perform a total printing and reset operation. Referring to Fig. 3, the machine during total and reset is driven by the reset motor RM which, through a suitable worm and worm wheel 55 drives the total shaft 56 through a suitable one revolution clutch. A ratchet wheel 57 is fixed to the worm wheel 55, which is free on shaft 56 forming one element of a one revolution clutch which is controlled by the reset magnet 314. A disk is fixed to the shaft 56 and carries a clutch pawl 59 whose function is similar to that just explained for the clutch pawl associated with the listing box cam. Pawl 59, however, is controlled through the magnet 314 by means of the arm 60. Energization of the magnet 314 attracts its armature to which the arm 60 is attached and rocks the the latter clockwise to release the pawl 59, permitting it to engage the teeth of ratchet 57 and drive the shaft 56. A box cam 58 is fixed to this shaft 56 and has a suitably shaped slot to coact with a roller on the end of rock arm 61 and rock shaft 62 to which this arm is attached. The rock shaft 62 (see Fig. 4) through arms 64 rocks the total taking shaft 65 of the upper set of accumulators and through gear sectors 66, shaft 67 and arms 68, rocks the total taking shaft 69 of the lower set of accumulators. The total is taken in the usual manner by feeler fingers which cooperate with stepped cams attached to the counter elements. This total taking occurs during the first half of the revolution of the total shaft 56.

During the second half of each revolution of this shaft the counter elements may be reset or restored to zero. The total shaft 56 (see Fig. 4) is provided with a mutilated gear 71 having gear teeth about half its periphery and carrying a semi-circular metallic plate about the other half of its periphery. This gear through a Geneva movement drives a gear 72 fixed to the reset shaft 73 for the upper set of counters. During the second half of the revolution this gear is rotated causing one revolution of the reset shaft 73 for the upper set of counters. The reset shaft 74 for the lower set of counters is driven from the upper reset shaft through a train of gears 75. Reset on individual counter banks may be effected by clutching the shaft on which the counters are mounted into the respective reset shafts. Each accumulator bank may be clutched to the reset shaft 73 or 74 electromagnetically by magnets 410 (see Fig. 1) causing engagement of the reset clutches 76 and closure of the zero button contacts 411 as explained in the copending application of Bryce, No. 227,127 and corresponding British Patent No. 299,014. The energization of the reset magnet 314 (Figs. 3 and 5) also effects closure of the contacts 315 through an arm 115 fixed to its armature structure, and through an arm and link 116 rocks a shaft 117 which at its opposite end (see Fig. 5) carries the arm 39 and notched lever 38 for holding the pawl 34. The energization of the magnet 314 then releases the pawl 34 as previously explained to insure printing in the first tabulating cycle of each group regardless of whether the machine is set for listing or straight tabulating.

Figure 5:
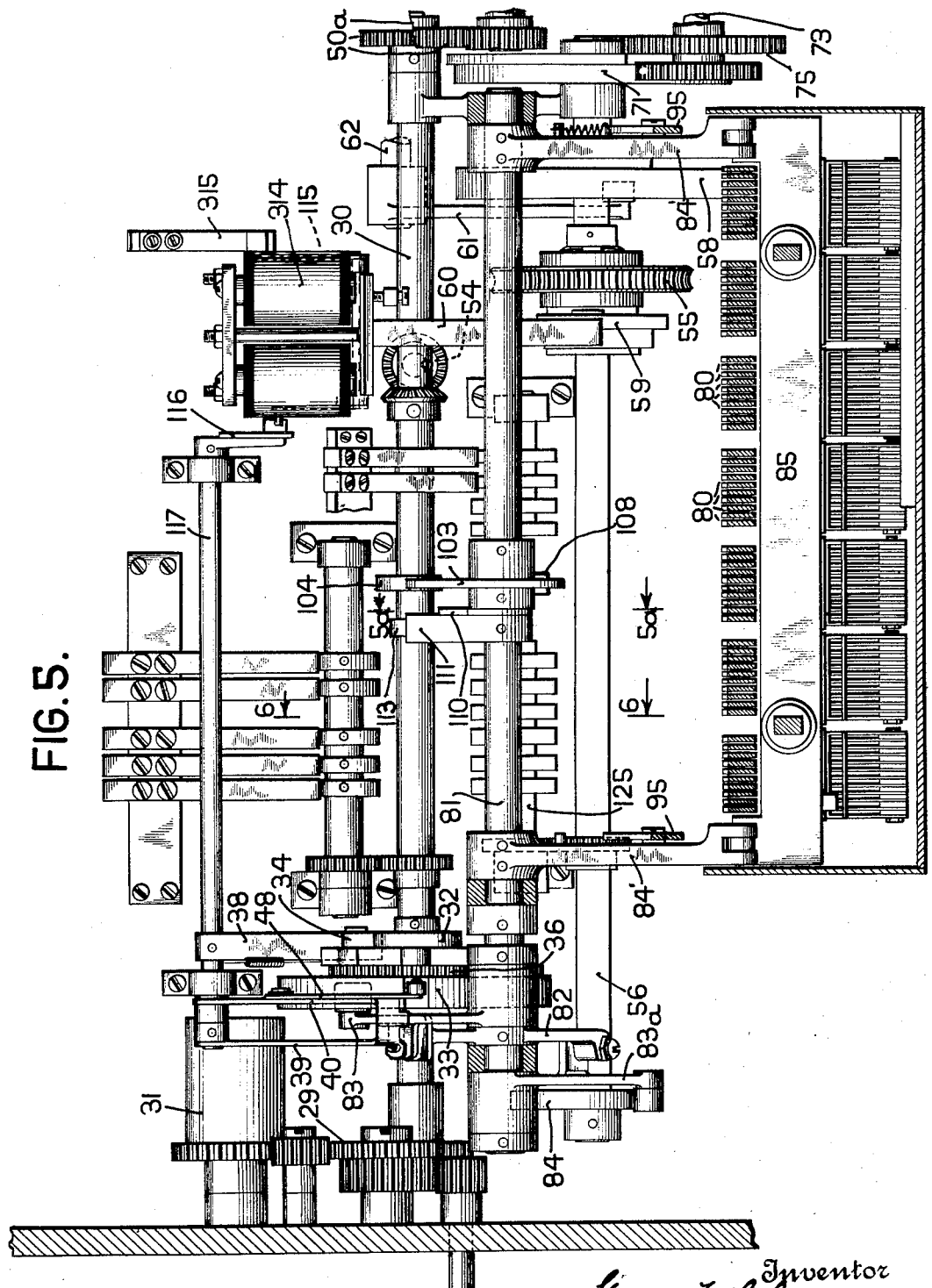
Fig. 5 is a horizontal section through the printing mechanism.

Printing must be effected during listing cycles and during total taking cycles. Operation of the type bars is effected from the list box cam 33 during listing cycles and from the total shaft 56 during totaling cycles. Referring to Figs. 3 and 5, the printing type bars, shown at 80, are operated from a rock shaft 81 which may be rocked either from the listing cam or the total taking shaft. The shaft 81 (see Fig. 2) has a two arm member 82 fixed to it.

An arm 83 freely rotatable on shaft 81 carries a roller which projects into the slot of listing box cam 33; another arm 83a, also freely rotatable on shaft 81, carries a roller cooperating with total print cam 84. A two armed member 82, pinned to shaft 81, has a set screw in one arm normally engaging the upper side of a sidewise lug on arm 83a.

A lug in the other arm of member 82 is normally engaged on its upper side by a set screw in arm 83. When the listing cam 33 rotates its groove rocks the arm 83 clockwise, while when the total cam 84 rotates it rocks the arm 83a clockwise. Either operation, owing to the cooperation of the lugs and set screws, results in clockwise rocking of the two armed member 82 and consequently the shaft 81 to which it is pinned. Fixed to this shaft 81 (see Figs. 3 and 5) are arms 84' pivoted at their free ends through suitable links to a slidable frame 85. The type bars are mounted for sliding motion in the frame and an extension 87 on each type bar takes under a portion of the frame against which it is pressed by a spring pressed lever 88, one of which is provided for each type bar and pivoted on a switch bracket on the frame. As long as there is no interference with the movement of the type bars they move upwardly with the frame 85, but they may be stopped at any point without interfering with the motion of the frame, the arm 88 in this case being pressed downwardly against the action of its spring.

Each type bar is provided with a rack 90 having one tooth for each of the type carried by the bar. The type bars are stopped in proper position to correspond to the perforations in the controlling records or to the data on the accumulators by printing magnets 366. A pull wire 91 attached to the magnet armature may operate a latch 92 causing it to release a corresponding stop pawl 93 spring pressed to engage the teeth of rack 90. Energization of any of the magnets 366 then causes the pawl 93 to stop further upward movement of the corresponding type bar. At the end of the normal upward movement of all type bars an arm 95 pivoted to the arm 84' releases a spring pressed bail 96 causing it to operate all the printing hammers 97 and print on the platen 98 from the selected type. On the ensuing downward movement of the frame 85 the latter engages the extensions 87 on the type bars and restores them to normal position.

Figure 6:
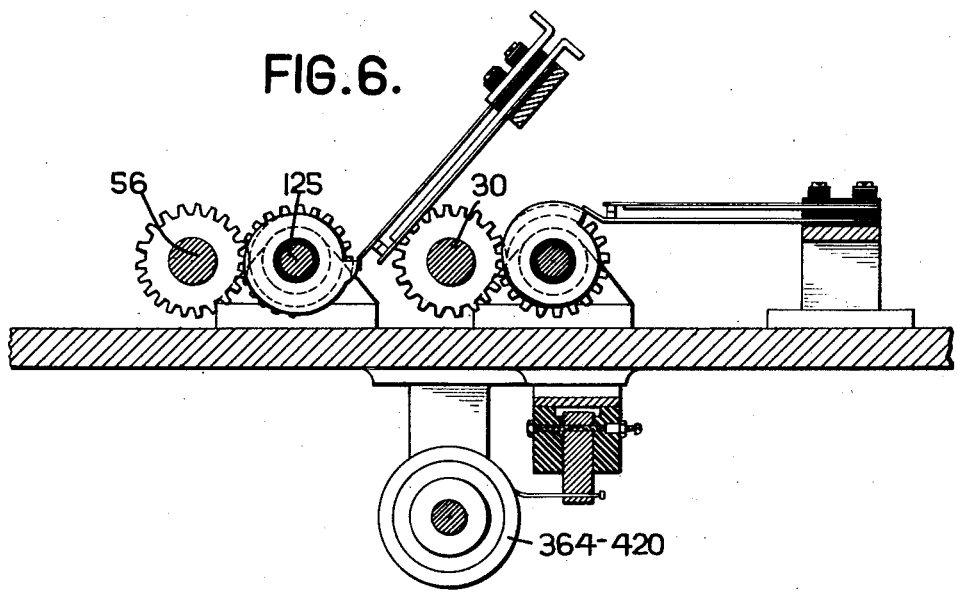
Fig. 6 is a detail vertical section on line 6—6 of Fig. 5.

In previous machines the pawls 93 have been restored by cam surfaces on the racks 90. This required an extra movement of the type bars resulting in slowing down of the printing speed which has been avoided in the present case by restoring the pawls 93 independently of the rack bars. A bail 100 fixed to a rocking frame 101 serves to restore all of the latches 93 at a predetermined point in the cycle regardless of whether it is a listing or totaling cycle. The frame is rocked by a lever 102, loose on shaft 81 and having one arm coacting with a cam 104 on listing shaft 30 and another arm coacting with a cam 108 on the total cam shaft 125 which is geared to the total shaft 56 (see also Fig. 6). Operation of either listing shaft or total shaft then effects rocking of the frame 101 to restore stop pawls 93.

Figure 5A:
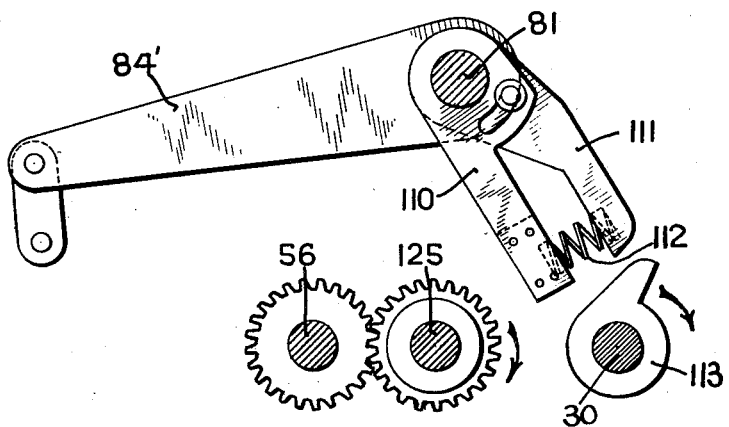
Fig. 5a is a detail section along line 5A—5A of Fig. 5.

Owing to the loose connection for operating the printing type which consists of the arms 82 and 83 (see Fig. 2), there is a tendency for the printing frame 85 (Fig. 3) to lag behind the machine operation. That is when the machine parts reach home position, often the frame 85 has not yet finished its downward movement. Consequently during the next cycle considerable shock results to the printing mechanism as the cams pick up the frame and reverse its motion before it has completely come to rest. This is avoided in the present case during listing cycles by a scissors structure, (see Fig. 5a) one arm 110 of which is freely mounted on the rock shaft 81 and the other arm 111 of which is pinned to the rock shaft. A spring 112 is interposed between the arms 110 and 111 and a cam 113 on the list shaft 30 coacting with arm 110 compresses spring 112 at the proper time in the cycle and tends to force the rock shaft 81 to home position, this operation occurring only toward the end of each listing cycle. In this manner the frame 85 is restored and reaches zero position in synchronism with the rest of the machine. This particular mechanism is fully disclosed and claimed in the copending application of Daly and Page, Serial No. 277,177, filed May 12, 1928 (now Patent No. 1,777,876) and is thus briefly explained on account of the effects which it has on the machine circuits as will be explained later.

Circuit diagram

The tabulating motor TM (see Fig. 17) is of the two speed type and its control and operating circuits are similar to those shown in the copending application of Daly and Page, Serial No. 6980 filed Feb. 5, 1925 (now Patent No. 1,762,145). The shunt field circuit of this motor contains a series resistance 300 which may be short circuited by the list cam contacts LC—1 or by the start relay contacts 301. As previously explained the contacts LC—1 are closed during printing operations and opened during straight tabulating operations to effect low speed, high torque characteristics for the motor during printing and high speed, low torque characteristics during tabulating. The relay 301 is adjusted so that its contacts close on the heavy starting current, but open as soon as the motor attains normal speed, thus providing for high starting torque under all conditions. The card feed clutch magnet 302 is in series with the tabulating motor so that it will be energized to cause operation of the usual type of one revolution card feed clutch as long as the motor TM is in operation. As long as the card feed clutch is in operation the record cards are fed successive to the upper and lower analyzing brushes of the machine. The tabulating motor and the card feed clutch magnet may be energized by momentarily closing the start key contacts ST. This completes the motor circuit through the motor relay 303, start key contacts ST, motor control relay contacts 304 (normally closed) and stop key contacts S to the binding post 2 which is connected to the main line 11 through the total cam contacts P—1 which are closed during listing or tabulating operations and opened during totaling operations.

The energization of motor relay 303 closes a stick circuit around the start key contacts which includes two branches, one containing the upper card lever relay contacts 305 and the other containing the cam contacts L—2. These upper car lever relay contacts are controlled by upper card lever relay #2 designated by 468b in series with upper card lever contacts 308 and remain closed as long as cards are passing the upper analyzing brushes. The contacts L—2 maintain the shunt around the start key contacts while the last card from the magazine is passing the lower analyzing brushes. This circuit may be opened manually by operation of the stop key to open its contacts S or automatically under group control by energization of the motor control relay 307 to open its contacts 304. The opening of either of these contacts diverts the motor and clutch magnet circuit through the cam contacts L—1 or cam contacts T—1 in series with list cam contacts LC—2. If the machine is under straight tabulating or non-lising operation the list cam contacts LC—2 are open and the opening of the cam contacts L—1 towards the end of the cycle interrupts the motor circuit at the proper time to bring the parts to normal home position. If the machine is under listing operation the list cam contacts LC—2 are closed and the tabulating motor circuit is interrupted by the opening of the cam contacts T—1 which open slightly later than the cam contacts L—1. This dual control is necessary to take care of the different coasting conditions under listing and non-listing operations.

The interruption of tabulating and listing operations either prepares the machine for a manually initiated total and reset operation or automatically initiates a total and reset operation, depending on the position of the automatic reset switch 309. The card feed clutch magnet contacts 310 are held open as long as the card feed clutch is engaged but close when it disengages. If the automatic reset switch 309 is open at this time the machine comes to a stop, and the circuit through the reset motor RM and the reset clutch magnet may be completed by momentarily closing the reset key contacts R. If the automatic reset switch 309 is closed the total and reset operation is automatically initiated.

It will be recalled that, due to the higher printing speed of the present machine, the beginning of the totaling and reset operation should be delayed until all parts have positively come to rest after the last listing cycle. As in prior machines a pair of cam contacts L—4 is provided which close toward the end of each tabulating cycle and thus initiate automatic total taking when the contacts 310 close on disengagement of the card feed clutch. In the present machine the contacts L—4 do not control the reset motor directly but indirectly through a reset interlock relay 311. Toward the end of the last tabulating or listing cycle if the switch 309 is closed the reset interlock relay 311 is energized through a circuit extending from main line 10 through relay coil 311, wire 312, contacts 310, cam contacts L—4 and automatic control switch 309 to stop key contacts S and cam contacts P—1 to the other main line 11. The closure of the contacts of reset interlock relay 311 completes a stick circuit for its coil extending through wire 313 and cam contacts L—5. The starting circuit for the reset motor RM and reset clutch magnet 314 is established by the closure of cam contacts T—2 which close just before the tabulating devices of the machine come to rest. This circuit extends from main line 10 through reset motor RM and reset magnet 314 to cam contacts T—2, thence through the contacts of relay 311, wire 313 and cam contacts L—5 to the other main line 11. The reset operation thus starts substantially at the end of the last listing or tabulating cycle. These same starting conditions are imposed if the automatic reset switch 309 is open and the reset operation initiated manually by momentarily closing the reset key contacts R. In this case the reset interlock relay 311 is initially energized through a circuit including wire 312, clutch magnet contacts 310 and reset key contacts R.

The energization of reset magnet 314 closes contacts 315 and thereby provides a circuit for the reset motor and reset magnet 314 and the reset interlock relay 311, exclusive of the stick circuit of the latter. This new circuit extends through cam contacts T—2, wire 312 to binding post 7 thence through contacts 315 and wire 316 to cam contacts L—5 and the other side of the line. Owing to the high resistance 318 in series with the reset interlock relay 311, whose function will appear later, there may be a tendency for the current through this relay to drop sufficiently to permit its contacts to open and interrupt the stick circuit at the time cam contacts T—2 close providing a lower resistance path around it. The presence of this additional circuit makes it immaterial whether this occurs or not.

The present machine is provided with major and minor control of the type shown in the copending application of Bryce, Serial No. 227,127, filed Oct. 19, 1927, and corresponding British Patent No. 299,014, which will be explained hereinafter. The operation of the reset mechanism from this point on depends on whether both major and minor totals are to be taken or minor totals alone are to be taken. In the former case two total taking and reset cycles are necessary, while in the latter case only one is required. This is governed by the reset control magnet contacts 317 operated by magnet 319. When two total taking and reset cycles are required, these contacts remain open during the first cycle and are closed during the second cycle. If only one total taking cycle is required, these contacts close during this single cycle. The contacts 317 are in series with cam contacts P—3 which close shortly after the reset motor starts and open at the proper time to stop this motor at the end of a cycle with the machine elements in normal home position if they are permitted to assume control. Assuming that two total taking cycles are required the contacts 317 remain open during the first cycle and the closure of the cam contact P—3 has no effect. During the second cycle the contacts 317 are closed and when cam contacts P—3 close the reset motor is thrown directly between the main lines 10 and 11.

Incidentally the reset magnet 314 is short circuited between the binding posts 6 and 16 and deenergized, causing the reset clutch to disengage at the end of the cycle, and the reset motor is thrown directly in shunt with the high resistance path including resistance 318 and reset interlock relay 311. The latter thereupon releases its contacts, if it has not already done so, opening its stick circuit. The only circuit remaining closed in the reset section is now that including reset motor cam contacts P—3 and reset control contacts 317 and this is interrupted toward the end of the cycle by the opening of cam contacts P—3 to deenergize the reset motor.

Tabulating may be automatically initiated at the end of the last reset cycle by closing the automatic start switch 320. The cam contacts P—2 close momentarily at the end of each reset operation, but the motor control relay contacts 304, as will be explained later, remain open until towards the end of the last reset cycle. The closure of the cam contacts P—2 during the last reset cycle initiates additional tabulating operation if additional cards remain in the card magazine. The starting circuit for the tabulating motor in this case extends from main line 10 through tabulating motor TM, start relay coil 301, card feed clutch 302, motor relay 303 to auto start switch 320, thence through cam contacts P—2, lower card lever contacts 321 and upper card lever relay contacts 305 to motor control relay contacts 304 and through stop key contacts S and cam contacts P—1 to main line 11. The further control of the tabulator motor is as explained heretofore.

Major and minor control

The major and minor automatic control system used in the present machine will be described to bring out certain new selective switching features which form part of the present invention. The upper analyzing brushes are indicated at 330 (Fig. 17) connected to individual sockets 331, and coact with a common roller contact 332 permanently connected to the main line 10. The lower analyzing brushes 335, (Figs. 17A and 17B) connected to individual triple sockets 336, coact with a common roller contact 337. This roller contact is connected to the main line 11 through commutator 31 which closes and opens the circuit as each index point position of the records passes the lower brushes. The lower brush energizing circuit extends from the commutator 31 through wires 339 and 340 to lower card lever contacts 321 thence to line 11 through the control circuits of the tabulating motor and card feed clutch. The roller 337 will thus be energized for each index point position provided the tabulating motor and card feed clutch are operating and cards are passing the lower brushes to close the lower card lever contacts 321. The record cards bearing numeral designating perforations pass successively between the upper brushes 330 and their coacting roller 332 and the lower brushes 335 and their coacting roller 337. It will thus be clear that whenever an analyzing brush encounters a perforation in the card column which it analyzes it will be energized momentarily at a time fixed by the location of the perforation, and the resulting timed impulse may be utilized to operate the adding, listing and automatic control mechanisms to manifest the data in any of the usual manners.

The automatic control magnets are shown at 341 and are provided with the usual series contacts 342 to prevent sparking at the analyzing brushes. Each control magnet is connected to sockets 343 and 344 to permit it to be plugged in series between any upper and lower analyzing brush to effect automatic control from any card column. The automatic control contacts 345, of which one is associated with each control magnet, are arranged to close individually when the corresponding control magnet is energized and all of them open simultaneously towards the end of each tabulating or listing cycle. When the control perforations on successive cards under the upper and lower analyzing brushes agree all control contacts 345 which are properly plugged for automatic control close at some time during the cycle, while when the control perforations fail to agree one or more of the magnets fails to close.

The automatic control contacts 345 are all connected in series and a socket 346 is provided between each pair of them so that any number may be utilized and the control split into major and minor sections at any point. Under major and minor control when a group change occurs in the major section both the major and minor accumulators are arranged to take totals and clear, using two successive total taking and reset cycles, during the first of which the accumulator handling the minor items totals and clears and during the second of which the accumulator handling the major items totals and clears. When a group change occurs in the minor section alone only one total taking and reset cycle occurs, during which the accumulator handling minor items totals and clears. The total of the major items in this case is held on the major accumulator to permit the addition of major items thereto from the following card group.

Cam control contacts L—7 govern the operation of the machine under major control and cam control contacts L—6 govern the operation of the machine under minor control. Both of these contact devices are normally closed, but open for an instant towards the end of each tabulating or listing cycle. The contacts L—7 may be connected in parallel with the control contacts 345 selected for major control and the contacts L—6 may be connected in parallel with the control contacts 345 selected for minor control. As shown, contacts L—6 are in parallel with minor automatic contacts 345 numbered from 1 to 5 and contacts L—7 are in parallel with the other major automatic contacts 345. The shunt formed across cam contacts L—7 by major control contacts 345 extends from one terminal of contacts L—7 to the point of switch 348, thence, to the blade of switch 347 which is plugged to one terminal of the series connected major control contacts, thence through the major control contacts 345 whose other terminal is plugged to upper card lever relay contact 374, closed by cards under the upper brushes as long as major group control is operating, thence to binding post 15 back to the other terminal of cam contacts L—7. The switches 347 and 348 for this operation should be in open or full line position. The parallel connection including the major control contacts 345 and cam contacts L—7 is in series with a major control relay 350 while the parallel connection including the minor control contacts 345 and cam contacts L—6 is in series with a minor control relay 351. The major control relay is provided with back contacts 352 and front contacts 353 while the minor control relay is provided with back contacts 354 and front contacts 355. The front contacts of the major and minor control relays connect the relay coils directly to main line 10. The stick circuit for the major control relay extends from main line 10 through wires 356 and 357, through front contacts 353 and major control relay 350 and through the parallel connection including cam contacts L—7 and major automatic control contacts 345 to the main line 11. This circuit will be interrupted to deenergize the major control relay 350 by the opening of cam contacts L—7 at the end of any listing or tabulating cycle during which any of the major automatic control contacts 345 fail to close, due to disagreement of major classification perforations on the controlling records.

The stick circuit for the minor control relay 351 extends from main line 10 through wire 356, front contacts 355, minor relay coil 351 and zero button control magnet 358 to binding post 12. This binding post is connected to main line 11 serially through the parallel connection containing cam contacts L—6 and minor automatic control contacts 345 and the parallel connection containing cam contacts L—7 and the major automatic control contacts 345. It will thus be obvious that a change in the major group data deenergizes both major and minor control relays at the end of the cycle, while a change in minor group data alone deenergizes the minor control relay only. Deenergization of these relays opens their front contacts 353 and 355 and closes their back contacts 352 and 354.

The ultimate result of thus deenergizing the major and minor control relays is to force two reset cycles by the former to permit successive major and minor total printing and to force only one reset cycle by the latter. The back contacts 352 of the major control relay connect the motor control relay 307 and the reset control magnet 319 to the main line 10 and the back contacts 354 of the minor control relay connect them to the main line 10 through a parallel circuit. Deenergization of either the major or minor control relay, then, energizes the motor control relay 307 and reset control magnet 319 and they remain energized until both the major and the minor control relay are again energized. From the prior explanation it will be recalled that energization of motor control relay 307 opens its contacts 304 to stop the tabulating motor and prevent its restarting until the motor control relay 307 is again deenergized. The energization of reset control magnet 319, as previously explained, opens its contacts 317 to prevent the cam contacts P—3 from taking control of the reset motor thus forcing successive reset cycles until the reset control magnet 319 is again deenergized.

During each reset cycle cam contacts P—4 make and break and directly after they break, cam contacts P—5 make and break. Cam contacts P—4 connect major control relay 350 to the line 10 through the front contacts 355 of minor control relay 351. Hence the closure of cam contacts P—4 energizes major relay 350 only if the minor relay has been previously energized and, as deenergization of the major control relay always entails deenergization of the minor control relay the closure of these contacts during the first reset cycle is of no effect. The closure of cam contacts P—5 during the first reset cycle reenergizes the minor control relay 351 which in turn re-establishes its stick circuit. If the major control relay is energized at this time with its back contacts open, which will be the case if a group change has occurred in the minor control section alone, this energization of the minor control relay opening its back contacts 353 breaks the circuit of motor control relay 307 and reset control magnet 319. Thereupon contacts 304 and 317 close permitting interruption of reset and resumption of tabulating after a single reset cycle. If the major control relay is deenergized at the end of the first reset cycle its back contacts 352 provide a circuit for the motor control relay 307 and the reset control magnet 319 holding the contacts 304 and 317 open to force a second reset cycle. During this second cycle the closure of cam contacts P—4 effects energization of major control relay 350, establishing its stick circuit and opening its back contacts 352 to deenergize motor control relay 307 and reset control magnet 319. The reset is then interrupted at the end of the second cycle and tabulating may be resumed.

The actual printing of the major totals is controlled by the zero button control magnet 358 which is in series with the minor control magnet 351 and holds its contacts 360 closed as long as the minor control relay is energized. The selection of the accumulator for major total printing forms part of the new selective switching system of the present invention and will be explained later.

The major and minor control features are not limitations in the machine as they can be incapacitated, if desired, and the machine operated either under straight automatic control or last card operation. The switch 347, if closed, short circuits the cam contacts L—7 and throws the entire bank of automatic control contacts 345 in parallel with the cam contacts L—6. It also furnishes a current path for the major control relay exclusive of the contacts L—7 and any of the automatic control contacts 345. Under these conditions the major control relay 350 remains energized constantly and the minor control relay 351 controls the machine for straight automatic control. If the switch 348 is closed as well, a permanent current path is also provided for the minor control relay 351 to maintain it constantly energized and the machine is adapted for last card operation.

The major and minor control system also cooperates with the upper card lever relay contacts 372 and the lower card lever relay contacts 373 to permit starting of the machine under any conditions without interference from the automatic control system. Assume that cards have just been placed in the magazine, with automatic start and reset switches 320 and 309 closed, and that there are no cards under the upper and lower analyzing brushes. Ordinarily the major and minor control relays 350 and 351 would be energized from the last preceding total taking and reset operation, but to make the explanation complete it may be assumed that these relays are deenergized, as would be the case if the main line switch of the machine had been opened after this last preceding total taking and reset operation. The contacts 372 are in parallel with cam contacts L—6 and are controlled by upper card lever relay 468c (see also Fig. 17A) remaining closed as long as this relay is deenergized and being opened when it is energized. The contacts 373 are in parallel with cam contacts L—7 and are controlled by lower card lever relay LCLR (see also Fig. 17A) remaining closed as long as this relay is deenergized and being opened when it is energized.

The upper card lever relays 468a, 468b, 468c, and 468d, (Fig. 17A) are energized only when cards are under the upper analyzing brushes to close the upper card lever contacts and the lower lever relay LCLR is energized only when cards are under the lower analyzing brushes to close the lower card lever contacts. Under the conditions assumed, the major and minor control relays being deenergized, their back contacts 352 and 354 close the circuit of the motor control relay 307 opening motor control relay contacts 304. Now if the start key is depressed to close start key contacts ST the tabulating motor circuit will be ultimately completed through cam contacts L—1 or T—1 and consequently the tabulating motor will drive the tabulating and card feed mechanism through a single cycle, starting the first card from the magazine towards the upper analyzing brushes of the machine. At the end of this cycle the tabulating motor ceases operation, due to the opening of cam contacts T—1 or L—1, and two reset cycles ensue setting up or energizing the minor and major control relays 351 and 350 successively and energizing motor control relay 307 to close its contacts 304. Thereafter the tabulating motor again starts in operation through its normal circuit including contacts 304 and during the first cycle of operation the first card is fed to the upper analyzing brushes closing the upper card lever contacts. The upper card lever relay 468c is thereupon energized opening its contacts 372 and removing the shunt around cam contacts L—6. The opening of the latter toward the end of the cycle deenergizes the minor control relay to force another single reset cycle, the cam contacts L—7 still being shunted by the lower card lever relay contacts 373 to prevent deenergization of the major control relay 350. At the end of this single reset cycle the tabulating motor again starts in operation feeding the first card to the lower analyzing brushes and closing the lower card lever contacts 321. The lower card lever relay LCLR is now energized, through a circuit including wire 340 and lower card lever contacts 321, and its contacts 373 opened, removing the shunt around cam contacts L—7 whereupon the automatic control system assumes full control and tabulating continues until the end of the card group.

Had the major and minor control relays 350 and 351 been energized, permitting the motor control relay contacts 304 to close, before depressing the start key, the two reset cycles following the first card feeding cycle would have been omitted. In this case the first card would be started during the first cycle of operation of the tabulating motor and fed to the upper brushes during the second cycle causing contacts 372 to open. This cycle would thereupon be followed by a single reset cycle after which the first card would feed to the lower brushes causing opening of contacts 373 and permitting the automatic control system to assume control as before.

When the cards become exhausted from the magazine the last card must be fed to the lower analyzing brushes and both major and minor totals taken after the data from it have been entered into the accumulators. When this last card leaves the upper brushes and feeds to the lower ones, opening the upper lever contacts towards the end of the cycle, upper card lever relay 468a is deenergized opening its contacts 374 which deenergizes both the major and minor control relays 350 and 351 forcing two total taking and reset cycles in which major and minor totals are printed.

Adding, listing and totaling

The machine is provided with a listing bank, which will print but not accumulate, whose printing magnets are indicated at 362 (Fig. 17A) and are connected to individual sockets 363 through which they may be plugged to any of the lower analyzing brushes 335 to effect printing from any desired record columns. The printing magnets 362 are connected to main line 10 through a commutator 364 which as previously explained is arranged to make one rotation for each listing cycle when the machine is set up for listing and to make one rotation for the first cycle only when the machine is set up for straight tabulating. When the commutator is at rest or passing through home position it disconnects the printing magnets 362 from the main line 10 and when it is rotating it connects them to this line during the entering portion of each cycle. The structure and operation of this commutator are fully described and explained in the previously mentioned copending application, Serial No. 6980 (now Patent No. 1,762,145) and will not be dwelt upon further herein.

The accumulators, of which four banks, designated A#1, A#2, A#3, and A#4, are diagrammatically illustrated, while two additional banks A#5 and A#6 are indicated, comprise the usual counter magnets 365, each with an associated printing magnet 366. Each bank is also provided with the usual asterisk printing magnet 367 for indicating totals and the usual extra printing magnet 368 to total print from the counter wheel to the extreme left which is not ordinarily provided with a counter magnet and receives numbers only through transfer. Each counter magnet 365 is connected to an individual double socket 369 through which it may be plugged to any desired lower analyzing brush or other entry device. The lower analyzing brushes as previously explained receive an energizing pulse whenever they encounter perforations in the record cards and thus supply timed impulses to the counter magnets to effect entry of the data represented by the perforations. Each counter magnet has series contacts 375 which open as soon as the magnet is energized to prevent sparking at the analyzing brushes and listing contacts 376 which close as soon as the counter magnet is energized to close the circuit of the printing magnet for listing. The listing circuit extends from main line 10 through listing contacts 376 and printing magnet 366 to a common return contact 377 for each bank. These common return contacts or bars 377 are connected to a switching system indicated generally at 379 including a dial switch whose functions will be explained later.

The totaling circuits for the printing magnets include total taking contacts 380 controlled by stepped cams 381. The stepped cams are positioned by the counter wheels in the usual manner and when a total is to be taken the closure of contacts 380 is timed by the position of the cams so that an impulse through the printing magnet occurs at the proper time to select the type corresponding to the indicating position of the counter wheel for printing. The contacts 380 for each counter bank are connected to a common bar 382 which is connected to main line 10 through the usual zero button contacts 411 and a series of contacts representing a dial switch for preselecting subtraction operations. These dial switches, whose contacts are represented to the left in Figs. 17A and 17B will be hereinafter explained in detail.

For the present it suffices to point out that regardless of the position of the dial switches a circuit is always available between the main line 10 and the zero button contacts of each common bar 382. The printing magnet corresponding to the counter wheel on the extreme left of each bank is of course never required for listing and these magnets are connected to the dial switch systems 379 by individual wires 383.

*Accumulator and total dial switches*

Figure 8:
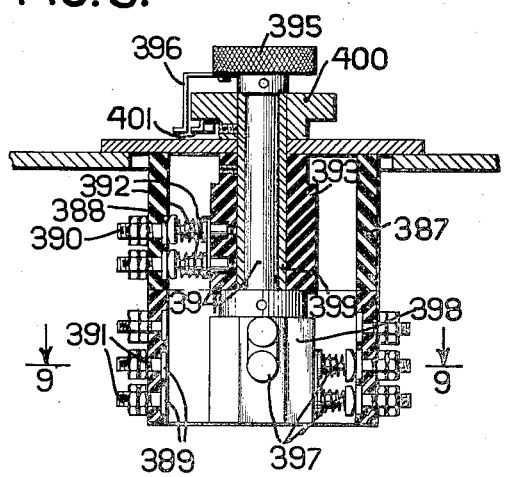
Figs. 7, 8 and 9 are detail views of the accumulator and total taking dial switches used to facilitate switching operations.
Figure 7:
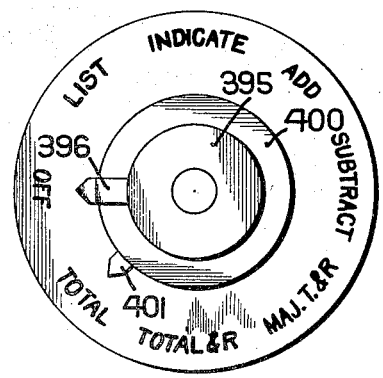
Figure 9:
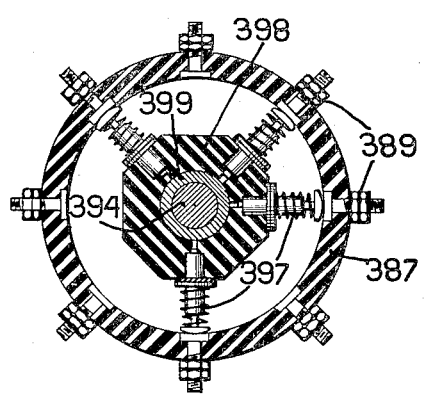

The mechanical structure of the dial switches for selecting accumulator and totaling operations is shown in Figs. 7, 8 and 9. Each accumulator is provided with one of these accumulator dial switches and one of the total dial switches combined in a single structure. A cylindrical member 387 has groups of contacts 388 and 389 on its inner surface, each contact being provided with a binding post 390 or 391 by which it may be wired to one of the machine circuits. The group of contacts 388, located in pairs in two circumferential rows are the total selecting contacts. The several pairs may be bridged, one pair at a time, by a pair of connected spring biased contacts 392 carried by a member 393 fast to sleeve 399 freely supported on central shaft 394. At its outer end this sleeve carries a knurled knob 400 by which it may be turned to selectively bridge any pair of the contacts 388. An indicator 401 is fixed to the knob 400 and may cooperate with suitable legends or marks as shown in Fig. 7 to indicate which pair of contacts is bridged.

The group of contacts 389 is arranged in three circumferential rows and the contacts are bridged in pairs by pairs of electrically connected spring biased contacts 397. Three pairs of contacts 397 coact with the contacts of the lower and middle rows of the group and one pair coacts with the middle and upper rows of the group. The spring biased contacts 397 are carried by a member 398 fast to central shaft 394. The shaft 394 at its outer end carries a knurled knob 395, by which it may be turned, and an indicator 396 for indicating its position. It will be obvious then that by turning the knob 395 to different positions different combinations of pairs of the contacts 389 will be bridged.

The operation of the selecting dial switches may be understood from the circuit diagram. The contacts 388 of the total selecting switches have been shown twice on the diagram to avoid undue complication of the circuits. They appear once in Fig. 17 opposite the zero button magnets and again in Figs. 17A and 17B between the counter banks and the balance selecting dial switches. Referring to Fig. 7 it will be noted that the total selecting switch may be moved to four positions labelled: Major Total & Reset, Total & Reset, Total Only and Off. With this switch in Major Total & Reset position the zero button magnet 410 associated with this particular counter bank is connected to main line 11 through the zero button control contacts 360. Each zero button magnet, incidentally, is connected to main line 10 through cam contacts P—6, P—7 or P—8 which close at the beginning of each reset cycle and remain closed during the active portion of it. With the total selecting switch in this position the counter is selected to print totals and reset only on a change in group data in the major control section. It will print and clear of course during the second reset cycle when the zero button control magnet 358 is energized as previously explained to close its contacts 360. The energization of the zero button magnet 410, it will be recalled, clutches the counter elements to the reset shaft and closes the zero button contacts 411 (Figs. 17A and 17B) to connect the common bar 382 of the counter to the main line 10.

The total selecting switch in Total & Reset position connects the zero button magnet 410 of the counter direct to the main line 10 whereupon closure of the cam contacts P—6, P—7 and P—8 in any reset cycle will cause the counter to print totals and clear. Such counters would of course print and clear on a change in the minor section of group control if the machine were under major and minor control and also on a group change with the machine under straight automatic control.

The total selecting switch in Total Only position opens the zero button magnet circuit entirely. There can therefore be no resetting of the counter. As will be seen from Figs. 17A and 17B however, the zero button contacts 411 are shunted to connect common bar 382 to main line 10 independently of them. Thus in any total without reset cycle the counter prints its total and retains the printed total. This permits the printing of so called progressive totals at any time.

The accumulator selector dial switches are diagrammatically represented in Figs. 17A and 17B with their associated circuits. The contacts 389 are shown in dial switch formation and the bridging contacts 397 are represented by small double tipped arrows. The accumulators may be selected by these switches, as indicated by the associated legends, for listing, addition (without listing) indicating or subtracting. The position of the indicator 401 of each switch is indicated in the circuit diagram by a dotted arrow and the positions of the bridging contacts 397 conform to the positions indicated. For the purpose of explanation the dial switch of accumulator bank #1 is turned to listing position; that of bank #2 to indicating position; that of bank #3 to adding (without listing) position and that of bank #4 to subtracting position. It will be understood, of course, that this particular set up would in all probability never be encountered in practice and that it has been assumed merely to explain the operation of the dial switches. The purpose of the dial switches is to provide for closing all circuits which must be closed to perform the selected operation and to open all circuits which could by any possibility interfere with the selected operation.

Considering first the listing operation, it will be recognized that four conditions must be fulfilled, namely;

a. The listing circuit must be completed from common bar 377 to the main line 11.

b. The indicating circuit must be eliminated.

c. The total printing circuit must be prepared from common bar 377 to the main line 11.

d. The total printing circuit must be prepared for the printing magnet 368 on the extreme left of the bank.

Referring to the dial switch of accumulator bank #1 which is set for listing it will be noted that all these conditions are fulfilled. The listing circuit extends from common bar 377 through wires 415, 416 and across a bridging contact 397 to wire 417 and across a bridging contact 397 to wires 422 and 423, thence to wire 424 and through cam contacts P—9 closed during listing to commutator 420 which connects the contacts P—9 to main line 11 during the entering portion of each listing cycle. The indicating circuit provides for item printing from the first card only of a group. This indicating circuit includes the GI master contacts 421 and it will be noted that with the dial switch in listing position the single connection between these contacts and the accumulator is broken. The general total printing circuit for the accumulator is prepared. This circuit extends from common bar 377 through wires 415 and 416, thence across a bridging contact 397 and wires 417 and 418 to contacts NL—1, closed during totaling, thence through cam contacts P—9 and P—12, both closed during the active portions of total print cycles, and through the closed non total switch 425 to line 11. The total print circuit for the printer magnet 368 is likewise prepared, this circuit extending from the magnet 368 through wire 383 and across a bridging contact 397 to wires 416 and 417 and thence to the main line 11 through the same path utilized by the general printing circuit.

The accumulator selector dial switch associated with accumulator bank #2 is set for indicating, meaning that the group or classification data from the first card only of a group will be listed even though additional items of the same group are entered into the accumulator. Ordinarily the accumulator is connected to the analyzing brushes to receive group data from each card and add it but the total of such items has no meaning and should not be printed. It is therefore necessary that the regular listing circuits and all totaling circuits be opened and a printing circuit be provided for the first card only. The conditions necessary in this case may be briefly summarized to the effect that the dial switch must connect the common bar 377 of the accumulator bank to the main line 11 during the first cycle of each group and must provide for disconnecting it therefrom during each of the subsequent listing cycles and during the total taking cycles.

An inspection of the dial switch associated with accumlator bank #2 discloses that only one of the bridging contacts 397 is active and that this one connects the common bar 377 to the GI master contacts 421. The contacts 421 it may be stated, are controlled by the GI master relay 427 (shown at the left of Fig. 17A) being closed when this relay is deenergized and open when it is energized. This relay is deenergized at the beginning of each tabulating run leaving its contacts 421 closed and they remain closed during the first cycle to permit listing from the first card of the group. Toward the end of each tabulating cycle the lower cam contacts L—10 close, energizing the GI master relay 427 and stick relay 428 at the end of the first cycle. The stick relay closes a holding circuit for the GI master relay extending through wire 430 and cam contacts P—1 to main line 11. This stick circuit persists, holding the GI master relay energized with its contacts 421 open until a total taking cycle occurs when the contacts P—1 open and allow the GI master relay to become deenergized.

The dial switch associated with accumulator bank #3 is in adding position. This means that items will be added on the counter and the totals may be printed, but that there will be no listing. In this case the listing and indicating circuits must be eliminated and the totaling circuits must be prepared. It will be noted that with the dial switch in adding position the GI master contacts 421 are disconnected from accumulator bank #3. The listing circuit extending to cam contacts P—10 through wires 422, 423 and 424 is open for this bank at its dial switch. The general totaling circuit is complete from common bar 377 through wire 415 to a bridging contact 397, thence through wires 417 and 418 to contacts NL3, thence through cam contacts P—10, common bar 435 and cam contacts P—12 to the main line 11. The total circuit for the printing magnet 368 on the extreme left of bank #3 is also prepared through wire 383 and a bridging contact 397 to wire 426 and 416 thence to the main line 11 through the general totaling circuit previously traced.

The accumulator bank #4 is selected for subtraction by its dial selector switch. Subtraction of items is effected by the addition of complements, therefore, the listing circuit should be eliminated. The indicating circuit should also be eliminated. An inspection of the diagram shows that both of these circuits for bank #4 are open at the dial switch. The general total print circuit for the bank should be prepared and it will be noted that the contacts NL—4 are connected to common bar 377 through wires 418 and 417 to a bridging contact 397 and thence to wire 415 thus fulfilling this condition. The general subtraction operation as explained in the copending applications of J. W. Bryce, Serial Nos. 119,803 and 222,467 (of which the former corresponds to British Patent No. 273,731 and the latter is now issued as U. S. Patent No. 1,791,953) involves entering each item on one counter in its true value and on another counter as a complement. At the end of the operation the true balance, positive or negative, appears on one counter and the complement of the true balance appears on the other. The true balance is printed while the complement is disregarded and this is effected by feeling out the accumulators for a nine on some counter to the left of the first significant figure of the balance, indicating a complement, and printing from the accumulator on which the nine is not encountered. The counter wheel on the extreme left of the bank as previously explained receives numbers only through transfer and therefore does not necessarily indicate nine in the case of a complement or zero in the case of a true balance. Total printing should therefore be suppressed from the printing magnet 368 which cooperates with the counter on the extreme left of the bank. An inspection of the bank #4 with its dial switch in subtracting position shows that the circuit of magnet 368 is open at the dial switch.

Class selection

It is often desirable to represent items of different classes in the same columns of the controlling records, but to enter the items of the different classes into different accumulators. Debit and credit items are often handled in this way, either for entry into different accumulators for separate addition of the classes or, in subtraction, for selecting the different balance accumulators into which true numbers or complements are to be entered. Cards bearing items of one class are identified by a perforation in a selected column. This perforation is located on the trailing portion of the card in the "X" position, which reaches the analyzing brushes after they have completely searched all item entry controlling positions. This perforation in the "X" position is omitted on cards bearing items of the other class. A class selecting relay 440 (shown at the top of Fig. 17A) has one terminal connected directly to the main line 11 and its other terminal connected to a class x plug socket 441 through cam contacts L—8 (Fig. 17). The socket 441 may be plugged to the upper analyzing brush socket 331 whose brush cooperates with the card column in which the X designation perforation occurs. The cam contacts L—8 close after the brushes leave the last item perforation position and remain closed until they encounter the X position. Any card bearing a perforation in the X position closes the circuit of the relay 440, while any card not bearing such a perforation does not. The relay 440, when energized, closes a circuit to main line 10 through its own contacts 442 and cam contacts L—9. The latter are normally closed but open for an instant between the last item designating position and the X position. If a card bears a perforation in its X position, then, the class selecting relay 440 is energized and remains so during the complete item entering portion of the following cycle when, incidentally, the items from the card are being entered into the accumulating or indicating devices.

A pair of class relays 443 and 444 are in parallel with class selecting relay 440 and are energized and deenergized with it. The class relay 444 controls contacts 445 (shown at the right of Fig. 17A) of which the middle one of each group is connected to a socket 446, the upper one of each group is connected to a socket 447 and the lower one of each group is connected to a socket 448. The middle contacts of all groups 445 are shiftable by the class relay 444, when energized, from their normal position in engagement with the lower contacts of the group into engagement with the upper contacts of the group. So when relay 444 is deenergized sockets 446 are connected to sockets 448, and when relay 444 is energized sockets 446 are connected to sockets 447. Then if sockets 446 are plugged to the lower analyzing brushes or other entry controlling devices and sockets 448 are plugged to the counter magnet sockets 369 of one accumulator bank while sockets 447 are plugged to the counter magnet sockets 369 of another accumulator bank, it is obvious that one bank will receive items from cards punched in the "X" position and the other bank will receive items from cards not so punched. The class relay 443 operates its contacts 449 in a similar manner. The contacts 449, however, are combined with certain GI mechanism as will now be explained.

Single card data feature

As previously explained the present machine is adapted to enter certain data from a single card of a group into an accumulator or indicator and suppress further entries from the same group into that particular accumulator or indicator. Conversely the data on a single card may be excluded from an accumulator which may receive entries from the other cards of the group in any of the usual manners. This single card data will be referred to for the purpose of identification as the "old balance" or "prior balance" because of one of the important uses of this feature. It will be understood, however, that such data is not limited to balance but may be of any nature.

Referring to Fig. 17A two GI multi-contact relays 455 and 456 are shown in parallel with GI master relay 427. The relays 455 and 456, as well as the relay 427, are energized towards the end of the first tabulating cycle of a group by the closure of lower cam contacts L—10 and when energized, owing to the establishment of a holding circuit closed by the relay 428 and including cam contacts P—1, remain energized until the following reset cycle when they are again deenergized by the opening of cam contact P—1. The GI multi-contact relays 455 and 456, then, are always deenergized during the first tabulating cycle of a group and energized during the subsequent tabulating cycles. These relays are provided with two sets of contacts, one set indicated at 457 (at the right of Fig. 17A) consisting of pairs connected to sockets 458 and 459 and the other set indicated at 460 consisting of groups each containing a fixed upper and lower contact and a shiftable middle contact. The upper contact of each group 460 is connected to a socket 461, the middle shiftable contact is connected to a socket 462 while the lower shiftable contact is connected to the middle shiftable contact of a group 449 controlled by class relay 443. The contacts 457 are normally open and are closed when the relays 455 and 456 are energized, that is they remain open during the first tabulating cycle of each group and are closed during the remaining cycles of the group. The contacts 460 remain as shown with the shiftable contact in engagement with the upper contact as long as the relays 455 and 456 are deenergized, but on energization of the relays the shiftable contact disengages the upper contact and engages the lower one. The groups 460 then connect sockets 461 to sockets 462 during the first tabulating cycle and connect socket 462 to the class contacts 449 during the remaining cycles.

Entry of data from the first card alone into an accumulator, may be effected by plugging the lower analyzing brushes or other entry control devices to sockets 462 and the accumulator counter magnet sockets 369 to the sockets 461. Entry of data from all cards except the first of a group into an accumulator may be effected by plugging the sockets 458 to the lower analyzing brushes or other entry control devices, and the sockets 459 to the counter magnet sockets 369 of an accumulator. Incidentally it will be noted that the same card columns may be utilized for the old balance data which occur only on the first card and data which are to occur on cards exclusive of the first. That is sockets 458 and 462 may be plugged to the same analyzing brushes while sockets 459 and 461 are plugged to different accumulating banks. There will be no intermingling of the data destined for the two banks as contacts 457 are always open when middle contact 460 is in engagement with its upper contact and vice versa.

The connection between lower contacts of groups 460 and the class contacts 449 permit data from all cards except the first of a group to be entered selectively into one or the other of two accumulators according to the presence or absence of "X" perforations. Furthermore, if desired, data from the same columns of the first card may be entered into still a third accumulator. This may be accomplished by plugging the sockets 462 to the lower analyzing brushes or other entry controlling devices, the sockets 461 to accumulator #1, the sockets 465 to accumulator #2 and the sockets 466 to accumulator #3. During the first card cycle the contacts 460 will be as shown in the drawing and the data from the first card will be entered into accumulator #1. During the following card cycles the middle contacts of groups 460 will shift to connect the entering control device to the class contacts 449 and data from the cards following the first will be selectively entered into accumulators #2 and #3 according to the presence or absence of the X perforations.

Finally the data from the first card alone may be selectively entered into one of two accumulators. This can be done by plugging the sockets 462 to the analyzing brushes and sockets 461 to sockets 446 of class contacts 445. The sockets 447 and 448 of the latter can then be plugged to different accumulator banks which will be selected according to the presence or absence of an X perforation on the first card.

Straight group indicating or the entry of classification data from the first card alone into an accumulator or the listing bank may be effected by plugging the sockets 336 of the desired lower brushes to the sockets 462 and the counter magnets or listing bank magnets to the sockets 461. In this case the sockets 487 and 488 of the class relays should be left unplugged. It will be understood that in all these operations involving GI operation in the sense that data from the first card only is entered the accumulator dial switches should be set to indicating position.

*Subtracting*

The manner of subtracting is fully explained and the translators fully described in the copending application of Bryce, Serial No. 222,467, now issued as Patent No. 1,791,953. As these features per se are not of the essence of the present invention they will not be explained in detail herein. Briefly the subtraction operation is performed by throwing each item into one balance accumulator in its true value and into another balance accumulator in its true complementary value. The true values of the debit items go into one balance accumulator and the true values of the credit items go into the other. At the end of a subtracting run, if the balance represent a debit, it will appear in its true value on the one accumulator and in its complementary value on the other. Conversely if the balance represent a credit it will appear in its complementary value on the one accumulator and in its true value on the other. The balance must be printed from one accumulator only, of course, and the one it is to be taken from depends on whether it represents a debit or a credit balance. At the end of each subtracting run one of the accumulator wheels to the left of one bank is felt out for the nine position, as the presence of a nine indicates a complement. The feeling mechanism when it encounters a nine then automatically selects the other accumulator to print the balance.

The complements of the items are obtained through translating devices including reading in mechanisms shown at 470 (Fig. 17A), each of which is connected to a socket 471 through which it may be plugged to an upper analyzing brush of the machine. Each reading in mechanism consists of a commutator which rotates synchronously with card feed and has spots on its periphery corresponding to the index point positions on the records. The commutators are connected to main line 11 through commutator F—1 and contacts 469 of upper card lever relay 468. The contacts 469 are closed as long as cards are under the upper brushes permitting the commutator F—1 to effect energization of the reading-in commutator spots for each index point position of the records. When the upper analyzing brush encounters a perforation one or more magnets 472 is energized, a different combination of magnets being energized for a perforation in each index point position. These magnets 472 shift brushes cooperating with the translator reading out mechanism shown at 473 and 473a. Each reading out mechanism also includes commutators which rotate synchronously with card feed and are provided with conducting spots around their peripheries. The spots are so arranged that when a combination of brushes is shifted in response to a particular index point a current pulse will be initiated timed according to the complement of the index point on the card which effected the set up. As these complementary impulses depend solely on the position of the conducting spots around the periphery of the reading out commutators it is obvious that each index point may be complemented to any desired number. The true complement is obtained by complementing the units order to ten and the higher orders to nine. As each card passes the upper analyzing brushes, then, the reading out commutator brushes receive a set up to make possible the reading out of the true complement. The complement is not actually read out and entered into an accumulator, however, until the following card cycle when the card which effected the set up is passing the lower analyzing brushes and may effect entry of the item into another accumulator in its true value. Current impulses representing the true and complementary values of items may thus cause concurrent actuation of different accumulators.

The reading out devices 473a are connected to main line 11 and to the middle shiftable contacts of groups 475. These middle contacts normally engage lower associated contacts to connect the reading out devices with sockets 477. They may be shifted to engage upper associated contacts to connect the reading out devices with sockets 476. Other groups of contacts 478 similar to 475 have upper and lower stationary contacts connected to sockets 476 and 477, respectively, and middle shiftable contacts connected to the middle shiftable contacts of groups 445 of the class relay 444. The shiftable contacts of groups 475 and 478 are normally in the position shown and operated by balance relays 480 and 481 to their alternative position in engagement with their upper stationary contacts. These balance relays are in parallel with class relays 443 and 444 from which it will be recognized that they are energized whenever a card bearing a distinguishing perforation in the X position is passing the lower analyzing brushes and are deenergized whenever a card without such a distinguishing perforation is passing the lower brushes.

It may now be assumed that certain upper analyzing brushes are connected to certain reading in devices 470, and that the corresponding lower brushes are connected to sockets 446 of the class relays of the corresponding reading out devices 473a. Also assume that the counter magnets of accumulator #1 are plugged to sockets 477 and that the counter magnets of accumulator #2 are plugged to sockets 476. As a card with no "X" perforation, for example, a debit card, passes the upper analyzing brushes, the complement of the item represented by it will be set up in the reading out devices 473. A card cycle later as the card is passing the lower analyzing brushes the contacts 475 and 478 will be in the position shown in the drawing as the balance relays 480 and 481 have failed to energize due to the absence of the X perforation on the card. During this cycle then the item in its true value will be entered into accumulator #2 through circuits including sockets 446 (from lower analyzing brushes) middle and lower contacts of groups 478 to sockets 476 (connected to the counter magnets of counter #2). Concurrently the true complement of the same item will be entered into accumulator #1 from the set up which was effected while the card was passing the upper brushes. The circuits in this case extend from main line 11 through reading out devices 473, middle and lower contacts of groups 475 to sockets 477 (connected to the counter magnets of accumulator #1).

Now if a credit card bearing an X perforation passes the upper brushes, the reading out devices 473 as before will receive set ups corresponding to the true complement of an item; and just before the card leaves the upper brushes its X perforation will cause energization of class selecting relay 440 which will establish the holding circuit for the class relays 443 and 444 and the balance relays 480 and 481. These relays will thereupon remain energized during the following card cycle and shift the middle contacts of groups 445, 475 and 478. As the card is passing the lower analyzing brushes, then, the true value of the item will be entered into accumulator #1 and its complementary value will be entered into accumulator #2. The circuits for the true value extend from sockets 446 (connected to the lower analyzing brushes) through middle and upper contacts of groups 478 to sockets 477 (connected to the counter magnets of accumulator #1). The circuits for the complementary values extend from main line 11 through reading out devices 473a, middle and upper contacts of groups 475 to sockets 476 (connected to the counter magnets of accumulator #2).

This operation continues throwing all debit items, on cards without X perforations, into accumulator #1 as complements and into accumulator #2 as true numbers; and all credit items, on cards with X perforations, into accumulator #1 as true numbers and into accumulator #2 as complements. At the end of a run the true balance, if a debit balance will appear on accumulator #2 and if a credit balance will appear on accumulator #1. In either case, of course, the complement of the true balance will appear on the other accumulator.

The debit items and credit items may also be totalized separately by connecting other accumulators to sockets 447 and 448 of the class contacts 445. For example, accumulator #3 may be connected to sockets 447 and accumulator #4 to sockets 448. Then all debit items alone will be entered into accumulator #4 and all credit items alone will be entered into accumulator #3.

The true complements of items are entered into the accumulators directly from the translators, that is the ten complement of the figure in the units order is entered and the nine complements of figures in the higher orders. If zero occurs in the units order, then, its complement, ten, must be entered into the units element of the accumulator. The use of standard counters in the machine introduces a complication on this account. These counter elements are designed to receive a maximum of nine units through a single direct entry in any one machine cycle and a possible additional one through transfer. The direct entry of ten, if the usual counter wheel clutch kick out is to be used for terminating the entry, must be started just before the card reaches the lower brushes. It will be recalled that the complementary value of an item is set up in the translator while the card is passing the upper analyzing brushes and that normally the entry is made during the following cycle while the card is passing the lower brushes. In the case of entering ten, the complement of zero, into the units column the counter wheel clutch actually engages at the end of the cycle during which the card passes the upper brushes. There is no motion of the wheel during this cycle, the whole entry being rolled into the wheel during the following cycle, but the premature operation of the clutch is essential to insure the entry of ten. At the end of a cycle prior to the entry of a ten, then, the counter wheel clutch is engaged and consequently the listing contacts 376 are closed. This makes no difference if the following cycle is a listing one as the listing circuits are broken by the accumulator selector dial switch when the accumulator is selected for subtracting. If the following cycle is a total taking one, however, the closed listing contacts provide a printing circuit for the units order printing magnet which would be closed at the beginning of the cycle and result in the printing of nine from this counter regardless of the position of the counter wheel.

A commutator 485 (Figs. 17A and 17B) is introduced into the listing circuit of the units element of each accumulator bank to prevent this. This commutator is driven by the tabulating drive mechanism which operates only during tabulating cycles and is stationary during total taking cycles. The commutator is arranged to interrupt the listing circuit of the units order element whenever the tabulating drive mechanism is in or passing through normal reset or home position and to close it in other positions. The listing circuit for this element is therefore available during the entering portions of tabulating or listing cycles but is broken to prevent undesirable printing during total taking cycles.

The complete complement of a number must be entered into an accumulator bank for additive subtraction, that is if a bank includes eight counters and a number in three figures is to be entered into its units tens and hundreds counters, nine must be entered into each of the five counters to the left of the hundreds counter. This could be done by assigning a column on the record cards to each counter element in the bank, that is for an eight column counter eight record columns would be used, those to the left of the first significant figure being punched in the zero position. This involves a useless waste of card space and according to the present invention only enough card columns need be assigned to subtractive items to allow for the maximum number of significant figures, the nines on the counter elements to the left being thrown in automatically. Referring to Fig. 17A cam contacts L—14 and L—15 are connected to main line 11 through wire 340, lower card lever contacts 321 and the operating circuits of the tabulator motor. These cam contacts close at the nine point of machine operation and thus initiate "nine" entering impulses whenever the machine is tabulating with cards under the lower brushes.

The cam contacts L—14 and L—15 are connected to middle shiftable contacts of groups 486 and 486a which are normally in engagement with lower coacting contacts connected to sockets 487 and 487a but are shiftable into engagement with upper coacting contacts 488 and 488a. The shiftable contacts of groups 486 and 486a may be operated by the class relays 443 and 444, moving to their alternative positions when these relays are energized to response cards bearing distinguishing X perforations. When debit cards without X perforations are passing the lower analzing brushes the "nines" impulses from the cam contacts L—14 and L—15 are available at the sockets 487 and when credit cards having X perforations are passing the lower analyzing brushes these impulses are available at the sockets 488. The counter elements to the left in the debit balance counter may be plugged in multiple to the sockets 488 and the counter elements to the left in the credit balance counter may be plugged in multiple to the sockets 487, and the nines will be properly entered.

The two accumulators involved in a subtracting operation must be analyzed at the end of a run to determine which one shows the true balance and is to print. The one holding the true balance is recognized by the presence of zeros on its counter elements to the left, while the one containing the complementary balance is recognized by the presence of nines on its counter elements to the left. It is only necessary to feel out one accumulator as, if nines are found on this one, the true balance occurs on the other while if zeros are found on this one it contains the true balance which is to be printed. The eighth counter wheel of each bank (Figs. 17A and 17B) is provided with a total step cam 490 having a step higher than normal in the nine position, so that, on a total taking operation, its contacts 491, if the counter wheel is in nine position close slightly ahead of the total step cam contacts 380 of any of the other counter wheels which happen to be in nine position. The total printing circuits of the two accumulators are controlled by a balance selecting relay which, when energized, breaks the circuits of one and prepares the circuits of the other and when de-energized prepares the circuits of the one and breaks the circuits of the other.

One of the accumulator banks is selected for the feeling out operation and its total step cam contacts 491 are connected to the balance selecting relay. After the contacts 491 would close if there were a nine on their counter wheel, but prior to the normal printing time of any of the other accumulators a current pulse is sent through the circuit containing the contacts 491. If there is a nine on their counter wheel, indicating a complement and that the balance is to be printed from the other accumulator, the balance selecting relay is energized to select the other accumulator for total or balance printing. If there is a zero on the counter wheel the contacts 491 do not close, the current pulse does not reach the balance selecting relay and the total circuits effect printing from the accumulator with which the selected contacts 491 are associated.

The present machine is arranged so that two complete subtracting banks, each including two balance accumulators may be formed and so that any accumulator in the machine may be selected for either the positive or negative balance accumulator for either subtracting bank. In practice, and hereinafter, items which are entered on cards which do not carry a distinguishing "X" perforation are designated as positive items while items entered on cards which carry an X perforation are designated as negative items. If the aggregate value of items on cards without the X perforation exceeds the aggregate value of items on cards with the X perforation a positive balance results and vice versa.

The selection of the several counters as positive or negative balance counters is effected by a series of dial switches, four in number, two of which select the counters for negative balances and two of which select them for positive balances. It will be understood, of course, that when an accumulator is selected for positive or negative balances its total printing operation must be coordinated with the entering operation so that the items from cards bearing an X perforation will be entered in their true value into the accumulator selected for negative balances and that the items from cards not bearing an X perforation will be entered in their true value into the accumulator selected for positive balances.

Figure 10:
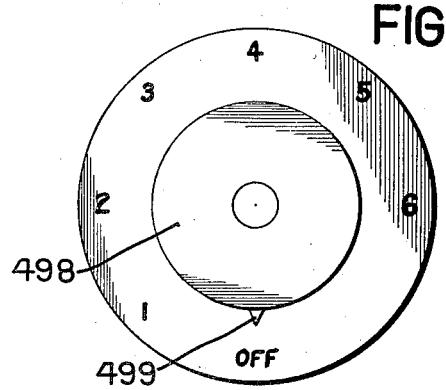
Figs. 10, 11 and 12 are detail views of similar subtraction control dial switches.
Figure 11:
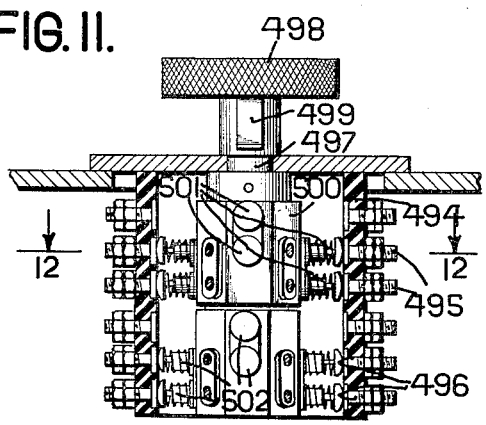
Figure 12:
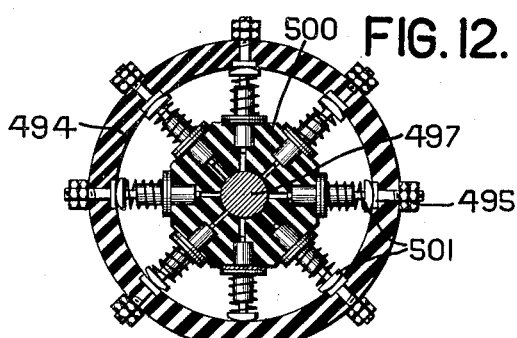

The balance selecting dial switches are illustrated in Figs. 10, 11 and 12. These switches are similar in general structure to the accumulator dial switches previously described. Each is provided with a hollow cylindrical casing 494 in which are fixed two groups of contacts 495 and 496, each group arranged in three circumferential rows. A central shaft 497 is provided with a knurled head 498, by which it may be turned, and an indicator 499 for indicating its position. The shaft 497 carries an insulating member 500 on which is mounted a number of pairs of connected spring biased contacts 501 and 502 arranged to bridge certain combinations of contacts 495 and 496 in adjacent circumferential rows in each active position of the indicator 499. There are six active positions of each indicator one corresponding to each of the six accumulator banks of the machine. The dial switches are arranged in pairs, one of each pair being designated +, indicating that it selects the accumulators for positive balances, and the other —, indicating that it selects the accumulators for negative balances. For the purpose of distinguishing the pairs they are labelled R (right) and L (left) respectively. The contacts of the +R switch are so associated with those of the —R switch that if the +R switch is turned to select a certain accumulator for positive balances the —R switch should be turned to select another accumulator for negative balances. The selected accumulators of course should always be selected so that the one for negative balances receives items from the "X" cards in their true values and the one for positive balances receives items from the cards not bearing "X" perforations in their true values. For the purpose of further simplifying the explanation the groups of contacts 495 are designated by the letter U (upper) and the groups of contacts 496 are designated by the letter L (lower). Thus the symbol +LR refers to the contacts 496 of the +R dial switch the symbol —LL refers to the contacts 496 of the —L dial switch and so on.

The general circuit diagram shows the contacts of the dial switch in simplified form and the full circuit connections are shown in Fig. 18. Referring first to the latter figure the four switches are diagrammatically illustrated with their groups of contacts 495 and 496 arranged about concentric circles representing the circumferential rows in the switch structures. The groups of contacts 495 for the four switches are each arranged about three concentric circles and the groups are designated +UL, +UR, —UL and —UR respectively. The position of the indicator 499 is represented by the arrow and the bridging contacts 501 are represented by small double tipped arrows. It will be recalled that when the indicator is shifted all the bridging contacts shift with it. One bridging contact 501 is located in line with the indicator and serves to bridge one contact on the inner circle to one on the middle circle. Other bridging contacts 501 serve to bridge each contact on the outer circle to a corresponding one on the middle circle, these bridging contacts being arranged to bridge each pair of contacts except that to which the indicator points. The indicator is shown in zero or inactive position and it has six additional active positions in each of which it selects the accumulator indicated for a balance accumulator; for example, if the pointer of a + switch is turned to No. 3 position it selects the accumulator bank No. 3 as a positive balance accumulator. It will be understood, of course, that when the dial of the switch is turned both the bridging contacts 501 and 502 move with it.

The dial switches operate in pairs so that if the positive balance accumulator for a certain subtracting operation is selected by the dial switch +L, the negative accumulator for the same subtracting operation must be selected by dial switch —L. The dial switches +R and —R cooperate in like manner. Furthermore, since any accumulator may be selected by any dial switch it is necessary to assign a priority sequence for the several switches and operations. If an accumulator is selected by the +L switch provision is made for preventing its selection by the +R switch, in other words the +L switch has precedence over the +R switch. These interlocks necessitate a complicated switching arrangement which will now be explained in detail in connection with Fig. 18.

Considering first the dial switch +L the contacts 495 (+UL) of the inner circle are all connected together and to back contacts 505 of a balance selecting relay 506 (see also Fig. 17B). The contacts 495 of the middle circle (+UL) are connected to corresponding contacts 495 of the outer circle of group +UR and the contacts 495 of the outer circle (+UL) are connected to corresponding contacts in the outer circle of group —UL. The contacts 496 of the inner circle of group +LL are connected together and to cam contacts P—14 (see also Fig. 17B) whose function is to apply the current impulse just prior to normal nine printing to selectively energize the balance selecting relay. The contacts 496 of the middle circle of group +LL are each connected to the corresponding step cam contacts 491 which are associated with the total step cams having abnormally high nine steps. The contacts 496 of the outer circle of group +LL are connected to corresponding contacts 496 of the middle circle of group +LR.

The dial switch −L has the contacts 495 (−UL) of its inner circle connected together and to the coil of balance selecting relay 506 (see also Fig. 17B). The contacts 495 (−UL) of the middle circle are connected to corresponding contacts 495 on the outer circle of group −UR of dial switch −R. In the −LL group of contacts the inner circle contacts 496 are connected to the similar inner circle contacts of switch −R (−LR); the middle circle contacts (−LL) are connected to corresponding contacts in the outer circle of contacts (−LR) of the dial switch −R and the outer circle contacts 496 (−LL) are connected to the middle circle contacts 495 (+UR) of dial switch +R.

The inner circle of contacts 495 (+UR) of dial switch +R are connected together and to the back contacts 507 of balance selecting relay 508 (see also Fig. 17B) which corresponds in function and operation to the balance selecting relay 506. The inner circle of contacts 496 (+LR) of dial switch +R are connected together and to cam contacts P—16 (see also Fig. 17B) which correspond to cam contacts P—14. The outer circle of contacts 496 (+LR) are individually connected to printing magnets 366 with which the high nine step total cam 490 of the corresponding accumulator is associated.

The inner circle contacts 495 (−UR) of dial switch −R are connected together and to the coil of balance selecting relay 508 (see also Fig. 17B) and the middle circle of contacts (−UR) are connected to inner circle contacts 496 of groups −LL and −LR. Finally the middle circle of contacts of the group −LR are connected to the Total Only contacts of the total selecting dial switches of the corresponding accumulator.

The circuits connected to and interconnecting the balance selecting dial switches have now been explained in detail just as they would be wired in practice. In the general circuit diagram (Figs. 17A and 17B) however, the circuits have been considerably simplified by representing the dial switch contacts conventionally in groups of three, consisting of one shiftable contact coacting with two stationary ones. The groups are designated +UL, +UR, −LL, −LR, −UL, −UR, +LL and +LR to identify the dial switches to which they belong. The effect on the machine circuits will be exactly as caused by the operation of the dial switches if it is considered that the shiftable contacts remain as shown in connection with accumulator #1 as long as none of the dial switches is operated to select this accumulator for a positive or negative balance. If this accumulator is selected for a positive balance by the +L switch all the shiftable contacts of the +UL and +LL groups must be considered to shift to their alternative positions to engage the opposite stationary contacts. Likewise, if this accumulator is selected for a negative balance by dial switch −R all the shiftable contacts of groups −UR and −LR must be considered shifted and so on. In the diagram it has been considered that accumulator #2 (Fig. 17B) has been selected for a positive balance by dial switch +L and accumulator #3 has been selected for a corresponding negative balance by dial switch −L. The shiftable contacts of groups +UL and +LL associated with accumulator #2 are shown shifted as are likewise the shiftable contacts of groups −UL and −LL associated with accumulator #3.

The operation of selecting the true balance, be it positive or negative, for printing will now be explained. It will be recalled that the true balance is indicated by the presence of zero or nine on the eighth counter wheel of one of the accumulators and the positive balance accumulator is selected by the dial switches for the feeling out operation. Thus in accumulator #2 the shifting of the middle contact of group +LL has connected the total step cam contacts 491 to wire 510 which extends a circuit through cam contacts P—14 and balance selecting relay 506. Just after the beginning of each total taking operation the contacts P—14 close, opening again prior to the normal time for printing nines. Assuming then that a nine appears on the eighth counter wheel of accumulator bank #2, showing a complement, the closure of contacts 491 in response to the high nine step of cam 490 closes a circuit through balance selecting relay 506 permitting it to be energized by the pulse of current caused by the closure of cam contacts P—14. The circuit for this pulse extends from main line 10 through cam contacts P—13, which open and close with P—14 thence through wires 511 and 512, through the shifted contact of group +UL, through the groups +UR, −LL, −LR and zero button contacts 411 to step cam contacts 491, thence through shifted group contacts +LL to wire 510, cam contacts P—14, and balance selecting relay 506 to the other main line 11 through cam contacts P—11. The relay 506 being momentarily energized opens its back contacts 505 and closes its front contacts 516. The latter close a stick circuit for the balance selecting relay which thereupon remains energized until cam contacts P—11 open just prior to the end of the totaling cycle. The closure of front contacts 516 of the balance selecting relay also connects wire 517 to the main line 10. It will be noted that the operation of any dial switch to select any accumulator for positive or negative balances interrupts the direct connection of common bar 382 to main line 10 so that any accumulator selected by dial switches −L or +L may receive total printing current only through line 511 or line 517. In the present case common bar 382 of accumulator #2 is connected to line 511 through contacts +UL and common bar 382 of accumulator #3 is connected to line 517 through contacts −UL.

As it has been assumed that a nine appears on the eighth counter wheel of accumulator #2, meaning that this bank shows a complement, the accumulator bank #3 contains the true balance and must print. The printing circuit in this case then extends from main line 10 through front contacts 516 of balance selecting relay 506, wire 517, shifted −UL contacts of accumulator #3, group −UR, −LL, −LR, and zero button contacts to common bar 382 of this accumulator. The true balance (negative) on accumulator bank #3 has therefore been selected for printing due to the presence of nine on the eighth counter wheel of accumulator #2.

If the eighth counter wheel of accumulator #2 shows zero, meaning that this accumulator carries the true balance (positive) its total step cam contacts 491 associated with its eighth counter wheel are not closed when cam contacts P—14 close and consequently the balance selecting relay 506 remains de-energized with its back contacts 505 closed. The latter connects main line 10 to wire 511 and the total printing current is supplied through this wire, wire 512, shifted contacts +UL of accumulator #2, groups +UR, −LL, −LR and zero button contacts 411 to common bar 382 of this accumulator. The true positive balance is then printed from accumulator #2.

Any of the accumulators may be selected for positive balances by the dial switch +L and any other may be selected for corresponding negative balances by the dial switch −L in similar manner as may be ascertained by shifting the groups +UL, +LL, and −UL, −LL of the several accumulators.

The accumulators not selected by the dial switches +L or −L may be selected for positive balances by the dial switch +R or for negative balances by the dial switch −R. The operation in this case is entirely similar to that just explained and will not be repeated. The balance selecting relay 508 operates in connection with the R dial switches and its front and back contacts connect wires 518 and 519 selectively to main line 10 to supply balance printing current. The cam contacts P—16 correspond to cam contacts P—14 and serve to supply through wire 520 the energizing pulse to balance selecting relay 508 when the total step cam contacts 491 of the accumulator selected for positive balances by the dial switch +R close during the feeling out operation.

The priority sequence of the +L, −L, +R and −R switches may now be briefly indicated. It will be noted that wire 520 through which balance selecting relay 508 is selectively energized is disconnected from the cam contacts 491 of any counter selected by dial switch +L owing to the shifting of contact group +LL associated with that counter. Thus the +L switch takes precedence over the +R switch in selecting balance counters. Also due to the shifting of the groups +UL the associated counter is prevented from being connected to the wire 517 over which the negative balance printing current is supplied. Thus the selection of a counter for positive balances takes precedence over its selection for negative balances. Finally the selection of any of the accumulators for either positive or negative balances by any dial switch automatically disables the ordinary printing circuit and forces the balance printing current through the selective circuits just described. Referring to accumulator bank #1 which has not been selected for a balance and which shows the dial switch contacts in normal or zero position it will be noted that the common bar 382 is connected direct to main line 10 through dial switch groups +UL, +UR, −LL and −LR. This accumulator is thus adapted to print totals in the usual manner at any time. If any dial switch is operated to select this accumulator for a balance, however, one of these groups of contacts will be shifted, thus interrupting the direct connection of common bar 382 to main line 10.

The invention has now been fully disclosed in connection with one complete operative embodiment. It will be obvious, however, that many modifications both as to structure and operation will readily occur to those skilled in the art, which will be within the scope of the invention. Furthermore, it will be understood that the capacity of the machine may be readily increased in any of its functions that are shown by mere duplication of parts. The capacity of the disclosed machine has been more or less limited to avoid undue complications of the circuits and mechanisms. The invention is to be limited only as indicated by the following claims:

1. In a record controlled tabulating machine in combination, entering mechanism cooperating with record columns of a single group of record cards and a plurality of entry receiving devices adapted to be controlled thereby to receive items from the record columns and automatically shiftable connecting means for connecting said entering mechanism with one of said entry receiving devices to receive items from a single record only of the group and for connecting said entering mechanism with another of said entry receiving devices to receive items from remaining records of the group exclusive of the said single record of the group.

2. In a record controlled tabulating machine in combination, analyzing brushes for searching record columns of a single group of record cards, and a plurality of electrically controlled entry receiving devices adapted to be controlled thereby to receive items from the record columns and electromagnetic switching mechanism controlled by the machine for connecting one of said entry receiving devices with the analyzing brushes for receiving items from a single record only of the group and for connecting another of said entry receiving devices with said analyzing brushes to receive items from remaining records of the group and exclusive of the said single record of the group.

3. In a record controlled tabulating machine mechanism for segregating one item from a promiscuous group of additive items of different classifications comprising entering mechanism cooperating with record columns and a plurality of accumulating devices adapted to be controlled thereby for receiving items from the record columns, means for connecting one of said accumulating devices with said entering mechanism to receive items from a single record only of each group, suppressing further entries from the same group, and additional means operative on all records for entering the segregated and additional items selectively in one or the other of two additional accumulating devices whereby the segregated item is included in an accumulation of proper classification.

4. In a record controlled tabulating machine mechanism for segregating one item from a promiscuous group of additive items of different classifications comprising electrical record analyzing mechanism and a plurality of electrically controlled accumulating devices adapted to be controlled thereby, electromagnet switching mechanism controlled by the machine for connecting one of said accumulating devices directly to said analyzing mechanism to receive items from a single record only of each group and for connecting an additional pair of accumulating devices to said analyzing mechanism to receive a plurality of items including the segregated item through selective switching mechanism and means controlled by all records of each group for operating said selective switching mechanism to effect entry of an item therefrom in one or the other of said pair of accumulating devices whereby the segregated item is included in an accumulation of proper classification.

5. In a record controlled tabulating machine in combination, record analyzing means and a pair of entry receiving devices adapted to be controlled thereby, means controlled by machine operation to limit entries into said entry receiving devices to a single record of each group and record controlled means for selecting one or the other of said pair of entry receiving devices to receive items therefrom.

6. In a record controlled tabulating machine in combination, mechanism for automatically separating and distributing items of different classifications comprising entering mechanism cooperating with record columns of a single group of record cards and a plurality of entry receiving devices adapted to be controlled thereby to receive items from the record columns, automatically shiftable means for operatively associating one of said entry receiving devices with the entering mechanism to receive items from a single record only of the group, suppressing further entries therein from the same group, and means for automatically operatively associating another of said entry receiving devices with said entering mechanism to receive items from remaining records of the group exclusive of the single record of the group and for suppressing entry therein of items from said single record.

7. In a record controlled tabulating machine in combination entering mechanism cooperating with record columns and an entry receiving device adapted to be controlled thereby to receive additive items from the record columns, means for operatively connecting the entry receiving device with the entering mechanism and means for rendering said last named connecting means inoperative in connection with a single record of each group to prevent entry therefrom into the entry receiving device.

8. In a record controlled tabulating machine in combination, electrical record analyzing mechanism, an electrically controlled entry receiving device and an operating circuit connecting said analyzing mechanism with said entry receiving device including electromagnetic switching mechanism controlled by the machine for interrupting said circuit to prevent entry of items from a single record only of each group into the entry receiving device.

9. A cyclically operable accounting machine comprising a pair of entry receiving devices and entering means for selectively controlling the same and means for automatically connecting one of said entry receiving devices with the entering means during the first cycle of machine operation only and suppressing the operation of the connecting means while the other of said entry receiving devices is connected with the entering means during the subsequent cycles of machine operation.

10. A group indicating system for a tabulating machine comprising a plurality of relays each related to a particular order and each having a plurality of contacts, an operating coil for opening the contacts of the plurality of relays when energized and a circuit for said coil including machine operated contacts for closing the same towards the end of each tabulating cycle.

11. A group indicating system for a tabulating machine comprising a plurality of relays each related to a particular order and each having a plurality of contacts, an operating coil for opening the contacts of the plurality of relays when energized and a circuit for said coil including machine operated contacts for closing the same towards the end of each tabulating cycle and a stick circuit for said coil to maintain it energized.

12. A group indicating system for a tabulating machine which is provided with tabulating mechanism and total taking mechanism comprising a multi-contact relay including an operating coil for opening said contacts when energized, a circuit for said coil including machine operated controls for closing the same towards the end of each tabulating cycle, a stick circuit for said coil to maintain it energized and means for opening said stick circuit on operation of the total taking mechanism.

13. A cyclically operable tabulator comprising record analyzing means for searching records and translating means controlled thereby to translate data from a given card column into true complements of the same, an accumulator element including a clutch and means for engaging the same under control of the translating means during one machine cycle to enter ten and operating the accumulator to enter the ten during the following machine cycle.

14. A tabulating machine comprising tabulating mechanism, listing means and accumulating means, means for disabling the listing means in connection with one denominational order of the accumulating means when the tabulating mechanism is in home position and means controlled by the tabulating mechanism on leaving home position for rendering said disabling means ineffective.

15. A tabulating machine comprising total taking mechanism, listing means and accumulating means and means controlled by the total taking mechanism for automatically disabling the listing means in connection with one denominational order of the accumulating means when the total taking means is in operation.

16. A tabulating machine comprising a counter magnet, a listing magnet, accumulator operating mechanism with a circuit therefor and contacts closed by the counter magnet when energized for closing the listing magnet circuit and a commutator in said listing magnet circuit for opening the same when the accumulator operating mechanism is in home position.

17. A tabulating machine comprising total taking mechanism, a counter magnet, a listing magnet with a circuit therefor and contacts closed by the counter magnet when energized for closing the listing magnet circuit and a commutator in said listing magnet circuit for opening the same during operation of the total taking mechanism.

18. In a tabulating machine, tabulating mechanism and total taking mechanism, means for automatically initiating operation of said total taking mechanism on completion of an operation of said tabulating mechanism and interlocking means controlled by the tabulating mechanism for delaying the operation of said last named means until the operating parts of the tabulating mechanism have come to rest.

19. In a tabulating machine, tabulating mechanism and electrically operated total taking mechanism, a control circuit for said total taking mechanism including contacts controlled by the tabulating mechanism at the conclusion of a tabulating operation in series with contacts controlled by the tabulating mechanism when its operating parts reach rest position to close the control circuit and initiate total taking when the operating parts reach rest position at the conclusion of a tabulating operation.

20. In a record controlled tabulating machine, a plurality of accumulators, a major and minor automatic control system, reset mechanism with means for calling the same into operation under control of the automatic control system on a change in classification data on controlling records, a total print circuit for each accumulator including contacts, electromagnetic means for each accumulator for operatively connecting the same to the reset mechanism and for closing the contacts in its total print circuit, a circuit including contacts closed by the operation of the major portion only of the automatic control system and manually operable switching mechanism for each accumulator comprising a single operating number for selectively connecting its electromagnetic means to the circuit controlled by the major portion of the automatic control.

21. In a record controlled tabulator, a plurality of accumulators, a major and minor automatic control system and means controlled thereby for effecting accumulator total and reset on a change in major group classification data only on controlling records, means for effecting accumulator total and reset on a change of classification data of any sort on controlling records and selective mechanism associated with each accumulator including a single manually operable member for selectively connecting it to either of said total and reset means.

22. In a record controlled tabulator, a plurality of accumulators, a major and minor automatic control system and a major circuit controlled thereby and closed only on a change in major group classification on controlling records, a general circuit including contact mechanism for closing the same on a change in classification data of any sort on controlling records electrically operated total and reset mechanism for each accumulator and a dial switch for each accumulator having a single operating member for selectively operatively connecting its total reset mechanism to said major circuit or to said general circuit.

23. In an accounting machine, a plurality of accumulators, electrically controlled reset mechanism and electrically controlled total taking mechanism and a common control circuit for both for each accumulator, a total control circuit for each accumulator for controlling its total taking mechanism only and a dial switch for each accumulator having a single manually operable member for selecting the common control circuit or the total control circuit for operation.

24. In a record controlled tabulator, a plurality of accumulators, a major and minor automatic control system and a major circuit controlled thereby and closed only on a change in major group classification on controlling records, a general circuit including contact mechanism for closing the same on a change in classification data of any sort on controlling records, electrically controlled mechanism, and electrically controlled total taking mechanism and a common control circuit for both for each accumulator, a total control circuit for each accumulator for controlling its total taking mechanism only and a dial switch for each accumulator having a single manually operable mechanism for selectively connecting its common circuit to the major or general circuit or its total only circuit to the general circuit.

25. In a tabulating machine, a plurality of accumulators, a plurality of control circuits for the accumulators including group indicating control circuits, listing control circuits and total control circuits, a switching mechanism for each accumulator having a single manually operable member for operatively associating by a single operation the accumulator with the group indicating circuit and disconnecting it from the listing and total control circuits.

26. In a tabulating machine, a plurality of accumulators, a plurality of control circuits for the same including group indicating circuits, listing control circuits and total control circuits, a dial switch for each accumulator having a single operating member movable to group indicating, adding and listing positions and including means for connecting the accumulator to the group indicating control circuits and disconnecting it from all other control circuits when in group indicating position, and means for connecting the accumulator to the total control circuits when the operating member is in either adding or listing position.

27. In a tabulating machine, a plurality of accumulators, a plurality of control circuits for the same including listing control circuits and total control circuits and a dial switch associated with each accumulator including a single operating member movable to adding and listing positions and including means for connecting the accumulator with the listing and total control circuits when the member is in listing position and for connecting the accumulator with the total control circuits and disconnecting it from the listing circuits when the member is in adding position.

28. In a subtracting tabulating machine, a plurality of accumulators, listing, control circuits and total control circuits for said accumulators, a dial switch for each accumulator including a single operating member movable to a plurality of adding positions and a subtracting position and including means for connecting the accumulator with the total control circuit when the member is in the adding positions and for connecting the accumulator with the total control circuit and disconnecting it from the listing control circuit when the member is in subtracting position.

29. In a subtracting tabulator, a plurality of accumulators adapted to receive true and complementary values of items for effecting subtracting operations, determining means associated with each accumulator for manifesting the presence of a true or complementary balance thereon, a total taking circuit for each accumulator, shiftable means controlled by said determining means for selecting one or the other of two total taking circuits for operation, a pair of dial switches each having a manually operative member movable to positions indicative of the several accumulators, means controlled by one of said dial switches for selectively associating the determining means of the several accumulators with the shiftable means for controlling the same and the corresponding total taking circuits with the shiftable means for selection thereby and means controlled by the other of said dial switches for selectively associating the total taking circuits with the shiftable means for selection thereby.

30. In a subtracting tabulator, a plurality of accumulators adapted to receive true and complementary values of items for effecting subtracting operations, determining means associated with each accumulator for manifesting the presence of a true or complementary balance thereon, a total taking circuit for each accumulator, a relay having a coil with means for selectively energizing the same by the determining means and contact mechanism controlled by the coil when energized to select one of two total taking circuits and when deenergized to select the other of two total taking circuits, a pair of dial switches each having a manually operative member movable to positions indicative of the several accumulators, means controlled by one of said dial switches for selectively associating the relay coil with the determining means of the several accumulators and the corresponding total taking circuits with contact mechanism for selection under one energization status of the coil and means controlled by the other dial switch for selectively associating the total taking circuits with the contact mechanism for selection under the other energization status of the coil.

31. In a subtracting tabulator, a plurality of accumulators adapted to receive true and complementary values of items for effecting subtracting operations, determining means associated with each accumulator for manifesting the presence of a true or complementary balance thereon, a total taking circuit for each accumulator, a relay having a coil with means for selectively energizing the same by the determining means and contact mechanism controlled by the coil when energized to select one of two total taking circuits and when deenergized to select the other of two total taking circuits, a pair of dial switches each having a manually operable member movable to positions indicative of the several accumulators, a network of circuits connecting the relay coil to the several determining means and a network of circuits connecting the contact mechanism to the several total taking circuits and switching mechanism for the network in one of the dial switches for selecting the determining mechanism of the several accumulators for control of the relay coil and associating the corresponding total taking circuits with the contact mechanism for selection under one energization status of the coil and for preventing such association of more than one total taking circuit and switching mechanism for the network in the other dial switch for selectively associating any total taking circuit not selected by the first named dial switch with the contact mechanism for selection under the other energization status of the coil.

32. In a record controlled tabulating machine, an accumulator and record controlled means for entering successive items therein, printing mechanism associated with said accumulator having control mechanism operated by said accumulators for effecting the listing of items entered therein and means for automatically interrupting the control of said printing mechanism by the accumulator after listing of a single item.

33. In a record controlled tabulating machine, an accumulator and record controlled means for entering successive items therein, electrically controlled printing mechanism associated with said accumulator having a control circuit including switching mechanism operated by the accumulator for effecting the listing of items entered therein and means for automatically interrupting said control circuit after the listing of a single item.

34. In a record controlled tabulating machine in combination, entering mechanism co-operating with record columns and a plurality of entry receiving devices adapted to be controlled thereby for receiving items from the record columns, automatically operative selective mechanism for selecting one of a group of entry receiving devices, and automatically shiftable connecting means intermediate the entering mechanism and the entry receiving devices for connecting one of said entry receiving devices with the entering mechanism to receive items from a single record only of each group of records and for connecting said selective mechanism with the entering mechanism to permit items from records other than the said single record to be entered selectively in the group of entry receiving devices, whereby a plurality of items of different classifications may be read from record columns by the same entering mechanism and distributed to appropriate entry receiving devices.

35. In a record controlled tabulating machine in combination, entering mechanism cooperating with record columns and a plurality of entry receiving devices adapted to be controlled thereby for receiving items from the record columns, selective mechanism automatically controlled from the records for selecting one of a group of entry receiving devices, and automatically shiftable connecting means intermediate the entering mechanism and the entry receiving devices for connecting one of said devices exclusive of said group with the entering mechanism to receive items from a single record only of each group of records and for connecting said selective mechanism with the entering mechanism to permit items from records other than the said single record to be entered selectively in the group of entry receiving devices, whereby a plurality of items of different classification may be read from record columns by the same entering mechanism and distributed to appropriate entry receiving devices.

36. In a record controlled accounting machine, mechanism for segregating one item from a group of additive items all represented in similar columns of a group of controlling records comprising analyzing mechanism for searching the columns of the records, a pair of accumulators adapted to be controlled from said analyzing mechanism, automatically shiftable means for connecting one of said accumulators to said analyzing means for receiving an item from one record only of the group and means for connecting the other accumulator to said analyzing means for receiving items from all records of the group whereby the one accumulator will represent the item segregated and the other will represent an accumulation of items including the item segregated.

37. In a record controlled tabulating machine, mechanism for segregating one item from a promiscuous group of additive debit and credit items comprising entering mechanism cooperating with record columns and a plurality of accumulating devices adapted to be controlled thereby to receive items from the record columns, means for associating one of the accumulating devices with the entering mechanism to receive items from a single record only of each group, suppressing further entries from the same group and selective means for associating an additional pair of accumulating devices with the entering mechanism to receive items from all records including said single record, one of said pair receiving debit items in their true value and credit items in complementary value and the other of said pair receiving credit items in their true value and debit items in complementary value whereby the segregated item is included in its proper classification in a true balance on one or the other of said pair of accumulating devices.

38. In a record controlled tabulating machine, mechanism for segregating one item from a promiscuous group of additive debit and credit items comprising entering mechanism cooperating with record columns and a plurality of accumulating devices adapted to be controlled thereby to receive items from the record columns, automatically shiftable means for associating one of the accumulating devices with the entering mechanism to receive items from a single record only of each group of records, suppressing further entries from the same group and selective means automatically controlled from the record cards for associating an additional pair of accumulating devices with the entering mechanism to receive items from all records including said single record, one of said pair receiving debit items in their true value and credit items in complementary value and the other of said pair receiving credit items in their true value and debit items in their complementary value whereby the segregated item is included in its proper classification in a true balance on one or the other of said pair of accumulating devices.

In testimony whereof we hereto affix our signatures.

GEORGE F. DALY.
RALPH E. PAGE.